(12) United States Patent
Wang

(10) Patent No.: US 7,734,594 B2
(45) Date of Patent: Jun. 8, 2010

(54) SYSTEMS AND METHODS OF INFORMATION BACKUP

(75) Inventor: Jianxin Wang, Lake Grove, NY (US)

(73) Assignee: Computer Associates Think, Inc., Islandia, NY (US)

(*) Notice: Subject to any disclaimer, the term of this patent is extended or adjusted under 35 U.S.C. 154(b) by 374 days.

(21) Appl. No.: 10/737,109

(22) Filed: Dec. 15, 2003

(65) Prior Publication Data

US 2005/0038836 A1 Feb. 17, 2005

Related U.S. Application Data

(63) Continuation of application No. 10/382,057, filed on Mar. 5, 2003, now abandoned, which is a continuation of application No. 10/188,719, filed on Jul. 3, 2002, now abandoned.

(60) Provisional application No. 60/303,450, filed on Jul. 6, 2001.

(51) Int. Cl.
*G06F 7/00* (2006.01)
(52) U.S. Cl. ............... 707/644; 707/650; 707/653; 707/999.204
(58) Field of Classification Search ............. 707/1–10, 707/100–102, 104.1, 200–205, 640, 644, 707/650, 653; 711/162, 100; 709/225, 238; 717/127; 714/6
See application file for complete search history.

(56) References Cited

U.S. PATENT DOCUMENTS

| | | | |
|---|---|---|---|
| 4,644,496 A | 2/1987 | Andrews | 364/900 |
| 4,697,266 A | 9/1987 | Finley | 371/12 |
| 4,774,658 A | 9/1988 | Lewin | 364/200 |
| 5,133,065 A * | 7/1992 | Cheffetz et al. | 714/2 |
| 5,408,644 A | 4/1995 | Schneider et al. | 395/575 |
| 5,504,843 A | 4/1996 | Catapano et al. | 395/115 |
| 5,615,373 A | 3/1997 | Ho | 395/726 |
| 5,621,885 A | 4/1997 | Del Vigna, Jr. | 395/182 |
| 5,664,186 A * | 9/1997 | Bennett et al. | 707/204 |
| 5,671,350 A | 9/1997 | Wood | 395/182.13 |
| 5,721,835 A | 2/1998 | Niwa et al. | 710/303 |
| 5,778,395 A * | 7/1998 | Whiting et al. | 707/204 |

(Continued)

FOREIGN PATENT DOCUMENTS

| | | |
|---|---|---|
| EP | 0 899 662 A1 | 8/1997 |
| WO | WO 99/12098 | 3/1999 |
| WO | WO 01/01241 A2 | 1/2001 |
| WO | WO 01/35244 A1 | 5/2001 |

OTHER PUBLICATIONS

Dave Fetters, "Building a Storage Area Network," Network Computering, Online!, May 15, 2000.

(Continued)

*Primary Examiner*—Miranda Le
(74) *Attorney, Agent, or Firm*—Baker Botts L.L.P.

(57) ABSTRACT

A serverless backup system for backing up information on a network including one or more servers, includes a backup storage system for backing up information and a storage system for storing information to be backed up and restored, wherein information being backed up is transferred directly from the storage system to the backup storage system without going through a server and information being restored is transferred directly from the backup storage system to the storage system without going through the server.

27 Claims, 24 Drawing Sheets

U.S. PATENT DOCUMENTS

| | | | | |
|---|---|---|---|---|
| 5,835,953 | A * | 11/1998 | Ohran | 711/162 |
| 5,848,410 | A * | 12/1998 | Walls et al. | 707/4 |
| 5,870,542 | A | 2/1999 | Ander et al. | 726/5 |
| 5,889,896 | A | 3/1999 | Meshinsky et al. | 382/305 |
| 5,901,331 | A | 5/1999 | Schlegel | 395/842 |
| 5,907,672 | A * | 5/1999 | Matze et al. | 714/8 |
| 5,943,495 | A | 8/1999 | McLain, Jr. | 395/608 |
| 5,950,218 | A | 9/1999 | Howard | 711/4 |
| 5,983,240 | A * | 11/1999 | Shoroff et al. | 707/200 |
| 6,061,770 | A * | 5/2000 | Franklin | 711/162 |
| 6,081,875 | A * | 6/2000 | Clifton et al. | 711/162 |
| 6,088,694 | A * | 7/2000 | Burns et al. | 707/8 |
| 6,088,697 | A * | 7/2000 | Crockett et al. | 707/10 |
| 6,154,817 | A | 11/2000 | Mohan et al. | 711/162 |
| 6,173,293 | B1 | 1/2001 | Thekkath et al. | 707/201 |
| 6,182,226 | B1 | 1/2001 | Reid et al. | 713/201 |
| 6,199,074 | B1 * | 3/2001 | Kern et al. | 707/204 |
| 6,208,999 | B1 * | 3/2001 | Spilo et al. | 707/202 |
| 6,256,704 | B1 | 7/2001 | Hlava et al. | 711/112 |
| 6,269,431 | B1 * | 7/2001 | Dunham | 711/162 |
| 6,279,011 | B1 * | 8/2001 | Muhlestein | 707/204 |
| 6,341,302 | B1 | 1/2002 | Celis | 709/100 |
| 6,341,341 | B1 * | 1/2002 | Grummon et al. | 711/162 |
| 6,343,324 | B1 | 1/2002 | Hubis et al. | 709/229 |
| 6,366,986 | B1 * | 4/2002 | St. Pierre et al. | 711/162 |
| 6,385,706 | B1 * | 5/2002 | Ofek et al. | 711/162 |
| 6,400,730 | B1 * | 6/2002 | Latif et al. | 370/466 |
| 6,446,175 | B1 * | 9/2002 | West et al. | 711/162 |
| 6,460,113 | B1 | 10/2002 | Schubert et al. | 711/111 |
| 6,480,876 | B2 | 11/2002 | Rehg et al. | 709/100 |
| 6,487,561 | B1 * | 11/2002 | Ofek et al. | 707/204 |
| 6,549,992 | B1 | 4/2003 | Armangau et al. | 711/162 |
| 6,578,159 | B1 | 6/2003 | Kitagawa et al. | 714/15 |
| 6,584,582 | B1 | 6/2003 | O'Connor | 714/21 |
| 6,611,895 | B1 | 8/2003 | Krull et al. | 711/113 |
| 6,651,074 | B1 | 11/2003 | Taylor | 707/204 |
| 6,662,195 | B1 | 12/2003 | Langseth et al. | 707/200 |
| 6,704,886 | B1 * | 3/2004 | Gill et al. | 714/6 |
| 6,714,952 | B2 | 3/2004 | Dunham et al. | 707/204 |
| 6,721,902 | B1 | 4/2004 | Cochran | 714/6 |
| 6,728,848 | B2 * | 4/2004 | Tamura et al. | 711/162 |
| 6,738,923 | B1 * | 5/2004 | Blam et al. | 714/4 |
| 6,741,980 | B1 | 5/2004 | Langseth et al. | 707/2 |
| 6,745,281 | B1 | 6/2004 | Saegusa | 711/112 |
| 6,760,324 | B1 | 7/2004 | Scott et al. | 370/352 |
| 6,785,786 | B1 * | 8/2004 | Gold et al. | 711/162 |
| 6,799,258 | B1 | 9/2004 | Linde | 711/162 |
| 6,836,830 | B1 * | 12/2004 | Yamagami et al. | 711/162 |
| 6,848,007 | B1 | 1/2005 | Reynolds et al. | 709/245 |
| 6,880,005 | B1 | 4/2005 | Bell et al. | 709/225 |
| 6,950,871 | B1 | 9/2005 | Honma et al. | 709/226 |
| 6,968,463 | B2 | 11/2005 | Pherson et al. | 713/201 |
| 6,971,016 | B1 | 11/2005 | Barnett | 713/182 |
| 6,973,455 | B1 * | 12/2005 | Vahalia et al. | 707/8 |
| 6,976,039 | B2 * | 12/2005 | Chefalas et al. | 707/204 |
| 6,977,927 | B1 | 12/2005 | Bates et al. | 370/381 |
| 7,031,986 | B2 * | 4/2006 | Ito | 707/204 |
| 7,051,173 | B2 * | 5/2006 | Tsuchiya et al. | 711/162 |
| 7,058,798 | B1 | 6/2006 | Elley et al. | 726/30 |
| 7,072,057 | B1 | 7/2006 | Hansen | 358/1.15 |
| 7,117,340 | B2 * | 10/2006 | Matsui et al. | 711/209 |
| 7,149,698 | B2 | 12/2006 | Guheen et al. | 705/1 |
| 7,181,417 | B1 | 2/2007 | Langseth et al. | 705/26 |
| 7,289,964 | B1 | 10/2007 | Bowman-Amuah | 705/1 |
| 7,389,292 | B2 | 6/2008 | Prakash | 707/8 |
| 2001/0010070 | A1 * | 7/2001 | Crockett et al. | 711/162 |
| 2001/0044910 | A1 * | 11/2001 | Ricart et al. | 714/6 |
| 2002/0078117 | A1 | 6/2002 | Wang Baldonado et al. | 709/101 |
| 2002/0091747 | A1 | 7/2002 | Rehg et al. | 709/107 |
| 2002/0101604 | A1 | 8/2002 | Mima et al. | 358/1.15 |
| 2002/0107877 | A1 * | 8/2002 | Whiting et al. | 707/204 |
| 2002/0114001 | A1 | 8/2002 | Oyanagi | 358/1.15 |
| 2002/0135794 | A1 | 9/2002 | Rodriguez et al. | 358/1.15 |
| 2002/0156965 | A1 * | 10/2002 | Gusler et al. | 711/100 |
| 2002/0166079 | A1 | 11/2002 | Ulrich et al. | 714/6 |
| 2002/0188697 | A1 | 12/2002 | O—Connor | 709/219 |
| 2003/0018813 | A1 * | 1/2003 | Antes et al. | 709/245 |
| 2003/0033485 | A1 | 2/2003 | Ohr | 711/133 |
| 2003/0126225 | A1 * | 7/2003 | Camble et al. | 709/215 |
| 2003/0158836 | A1 * | 8/2003 | Venkatesh et al. | 707/1 |
| 2003/0163655 | A1 | 8/2003 | McKean et al. | 711/154 |
| 2003/0233370 | A1 | 12/2003 | Barabas et al. | 707/103 |
| 2004/0073677 | A1 | 4/2004 | Honma et al. | 709/226 |
| 2004/0143571 | A1 | 7/2004 | Bjornson et al. | 707/3 |
| 2004/0172631 | A1 | 9/2004 | Howard | 718/100 |
| 2004/0267807 | A1 | 12/2004 | Barabas et al. | 707/103 |
| 2005/0038836 | A1 | 2/2005 | Wang | 707/204 |
| 2005/0055444 | A1 | 3/2005 | Venkatasubramanian | 709/225 |
| 2005/0172093 | A1 | 8/2005 | Jain | 711/162 |
| 2007/0124349 | A1 | 5/2007 | Taylor | 707/204 |

OTHER PUBLICATIONS

Aberdeen Group, "CA's ARCserveIT Delivers Serverless, LAN-Free, File-Level Data Protection for SANs.", Jun. 1, 2000.

PCT Communication pursuant to Article 94(3) EPC and Notification of Transmittal of the International Search Report, Application No. PCT/US02/21050; 12 pages, mailed Dec. 28, 2007.

"About Access Control," Microsoft, XP-002231998, url:http://www.microsoft.com/WINDOWS2000/en/server/iis/htm/core/iiacnsc.htm, 4 pages, Feb. 14, 2000.

Ludens, "Windows 2000 Released," About.com, XP-002231999, url:http://windows.about.com/library/weekly/aa021400a.htm, 3 pages, Feb. 14, 2000.

Redhat, "Stronghold Web Server, Administration Guide," XP-022332280, Chapter 3, url:http://www.redhat.com/docs/manuals/stronghold/Stronghold-3.0-Manual/SH3-docs.pdf, 27 pages, Mar. 2000.

United States Patent and Trademark Office, Office Action for U.S. Appl. No. 10/995,746 mailed Jul. 24, 2008 in re Jain Mammohan, filed Nov. 22, 2004.

United States Patent and Trademark Office, Office Action for U.S. Appl. No. 10/995,746 mailed Aug. 11, 2008 in re Venkatasubramanian, filed Nov. 22, 2004.

PCT Notification of Transmittal of International Preliminary Examination Report mailed Aug. 1, 2008 in re PCT/US02/21235 filed Jul. 3, 2002.

United States Patent and Trademark Office, Office Action for U.S. Appl. No. 10/995,746, filed Nov. 22, 2004 in the name of Jain Mammohan, (24 pgs), Notification Date Dec. 24, 2008.

USPTO Office Action for U.S. Appl. No. 10/995,746, filed Nov. 22, 2004; inventor Manmohan Jain, (15 pages), Jul. 2, 2009.

N. Morton, et al., "Hierarchical File System Usage Guide," IBM, International Technical Support Organization, ibm.com/redbooks, Redbooks, 350 pages, Sep. 2000.

USPTO Office Action mailed electronically Dec. 9, 2009, U.S. Appl. No. 10/995,746, filed Nov. 22, 2004; inventor Manmohan Jain, (17 pages).

Hewlett Packard, "Storage Area Networking: Storage vs. Data Sharing—Creating Appropriate SAN Solutions", <URL:http://www.hpindia.com/pdf_files/storagevsdata.pdf>, pp. 1-7, Nov. 1, 1999.

Hewlett Packard, "Storage Area Networking: Building a SAN Using Hewlett-Packard's SureStore E SAN Manager LUN Management", <URL:http://www.hpindia.com/pdf_files/bldgasan.pdf>, pp. 1-9, Nov. 1, 1999.

Office Action Summary; U.S. Appl. No. 10/924,138, May 18, 2007.

Examiner's first report on patent application No. 2002346066 by Computer Associates Think, Inc., May 1, 2007.

* cited by examiner

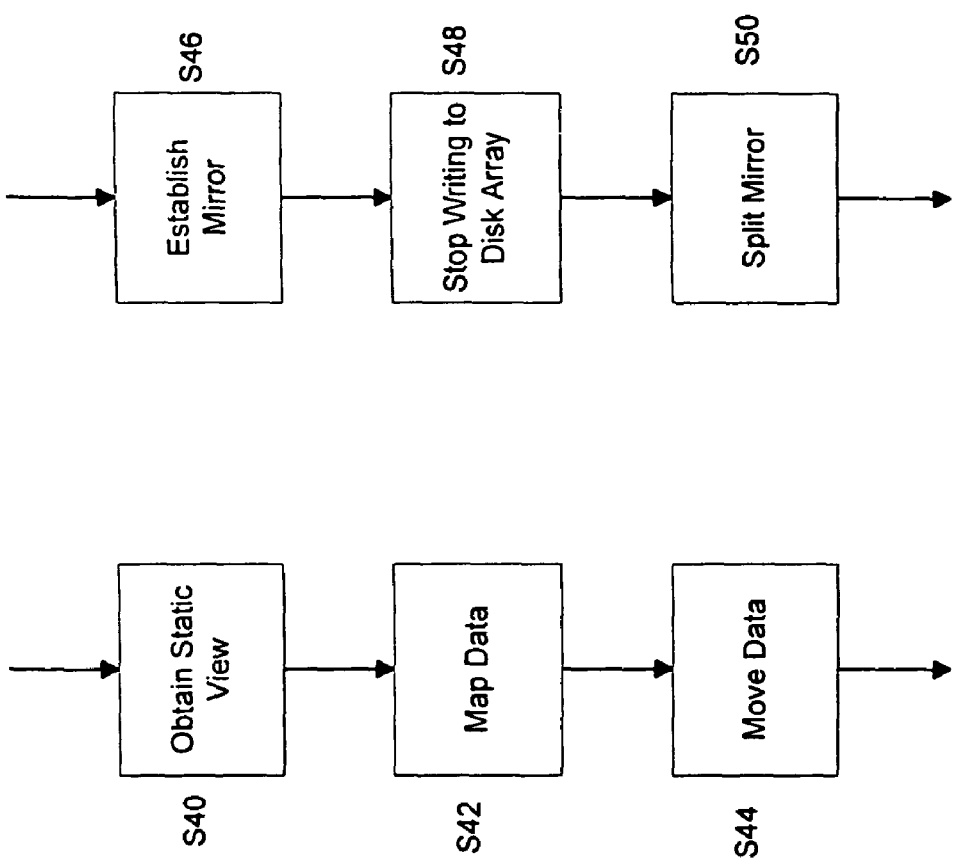
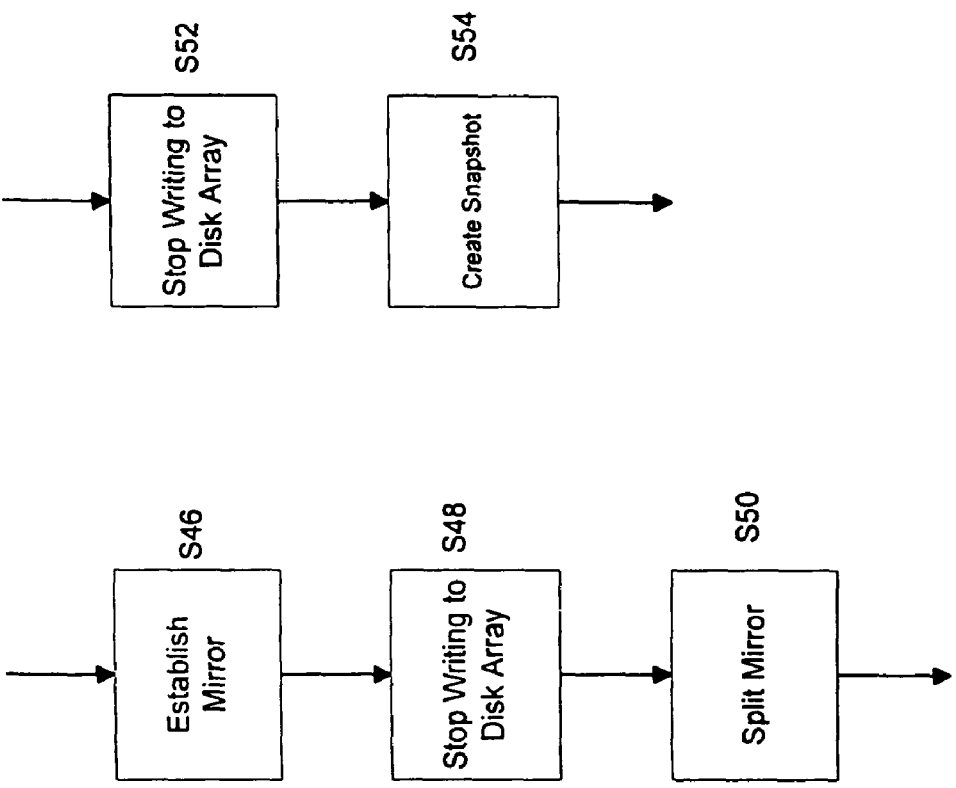
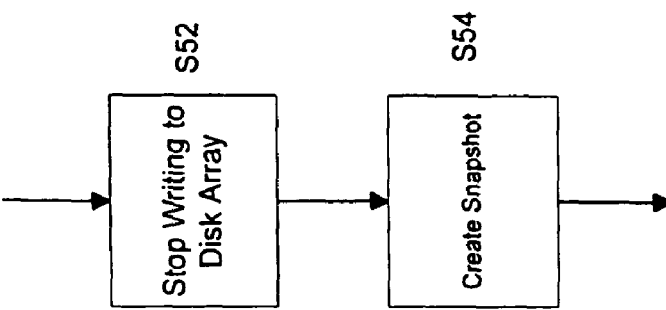

SYSTEMS AND METHODS OF INFORMATION BACKUP

This is a continuation of application Ser. No. 10/382,057 filed Mar. 5, 2003 now abandoned, which is a continuation of Ser. No. 10,188,719 filed Jul. 3, 2002 now abandoned which claims the benefit of Provisional application Ser. No. 60/303,450 filed in the United States on Jul. 6, 2001.

BACKGROUND OF THE DISCLOSURE

1. Field of the Disclosure

The present disclosure relates generally to backup systems and in particular, to systems and methods for providing information backup.

2. Description of the Related Art

Backup storage devices are used for backing up information on servers and other network machines or devices. Backup storage devices are often used to backup various types of information including, for example, files, databases, system information and files, etc.

When one backup storage device is shared among a plurality of host devices, problems may arise when accessing the storage device to read or write to it. An example of a local area network (LAN) including backup storage is shown in FIG. 1A. The LAN includes one or more workstations $5a$-$5n$, one or more servers $6a$-$6n$ and at least one backup storage device 7 interconnected via a network 9. Each of the workstations $5a$-$5n$ and servers $6a$-$6n$ my utilize different operating systems. Backup storage device 7 may be, for example, a tape device such as a tape library. If host devices such as the workstations $5a$-$5n$ or servers $6a$-$6n$ are sharing the same storage device 7, each operating system may attempt to store data in the same location on the storage device 7. In this case, data required by one host device might be overwritten by data from a subsequent write by another host device. In addition, some operating systems may store special information at specific addresses of the storage device 7. Some other operating systems may require that any attached storage devices have identifying information stored in one or more portions of that same area of storage. This results in conflicts and difficulties in providing such shared storage. A controller may be used to control access to the storage device 7. However, should the controller crash, the storage system data may be permanently lost.

Multiple storage devices may be provided for backing up data on host devices. However, managing multiple storage devices in an efficient and effective manner allowing backup and recovery for multiple hosts can be time and resource consuming and can utilize much of the bandwidth of the LAN or wide area network (WAN).

A storage area network (SAN) may be used to free up bandwidth on the LAN or WAN. A SAN is a high speed storage network of shared storage devices. A SAN makes all storage devices available to all hosts on the LAN or WAN, saving valuable bandwidth on the LAN or WAN.

FIG. 1$b$ depicts a SAN environment. The SAN includes a plurality of distributed servers $2a$-$2n$, connected to one or more storage devices such as backup libraries $4a$-$4n$, via a high-speed network 3. The backup devices $4a$-$4n$ may include, for example, tape libraries each including a plurality of storage media, a picker and one or more read/write devices for reading and writing to the storage media. The distributed servers $2a$-$2n$ and the backup devices $4a$-$4n$ may be interconnected via a high speed/high volume network 3 that may include various high-speed switches and/or bridges. With this type of environment, there are several ways that the servers $2a$-$2n$ and backup devices $4a$-$4n$ can be shared. For example, one of the servers $2a$-$2n$ may act as a chief arbitrator granting access of backup devices $4a$-$4n$ to all other servers. This is often referred to as a master/slave system. In a master/slave system, the intelligence lies with the master and the master has sole discretion and decision making authority regarding when and if to allow servers to access a backup device. The master creates and maintains information regarding the state of each of the devices on the network.

One problem with the master/slave system is that if the master crashes, it may take a lot of time and effort to configure another server as the master. All other servers will wait until another master server has been designated and configured by the system administrator. The new master will then re-inventory the network, and build up information regarding the state of each device on the network. This can be a time consuming and costly procedure.

Another approach is to partition access of a backup device among the servers, so that each server is capable of accessing only the drives and slots in the library within its partition. However, this system may not make the most efficient use of the backup devices.

In many backup operations, the backup application reads the data from the primary storage device to the server memory, does necessary formatting, and sends it to the appropriate backup storage devices. These processes involve heavy utilization of CPU, IO channels and the system memory. It is quite possible that when backup operations are in progress, the servers may not be able to perform any other application processing. This is one of the reasons why system administrators prefer to perform backup at a time when the application load on the server is at a minimum. It would be beneficial if the backup operations could be performed without requiring heavy utilization of the server system, thereby freeing up the server even during information backup.

SUMMARY

A serverless backup system for backing up information on a network including one or more servers, comprises a backup storage system for backing up information and a storage system for storing information to be backed up and restored, wherein information being backed up is transferred directly from the storage system to the backup storage system without going through a server and information being restored is transferred directly from the backup storage system to the storage system without going through the server.

The backup storage system may comprise a tape storage system and the storage system may comprise a disk storage system. The network may comprise a storage area network. The information may be transferred between the backup storage system and the storage system using an Extended Copy command. Prior to transferring information directly from the storage system to the backup storage system, a snapshot of the storage system may be taken. A period of write inactivity to the storage system may be waited for prior to taking the snapshot. The period of write inactivity may be a predefined period of time. If the period of write inactivity does not occur by time a timeout period has expired, the transfer may fail. The timeout period may be a predefined period of time.

Also disclosed is a serverless backup method for backing up information on a network including one or more servers, comprising providing a backup storage system for backing up information, providing a storage system for storing information to be backed up and restored and backing up information by transferring information directly from the storage system to the backup storage system without going through a server and restoring information by transferring information directly from the backup storage system to the storage system without going through the server.

Also disclosed is a computer readable medium including code for performing a serverless backup method for backing up information on a network including one or more servers, comprising code for backing up information by transferring information directly from a storage system to a backup storage system without going through a server; and code for restoring information by transferring information directly from the backup storage system to the storage system without going through the server.

Also disclosed is a serverless backup method comprising opening a file system root directory, parsing the file system root directory for allocation tables of each file and finding attributes of each file, examining the attributes of each file and determining whether a file is resident or non resident, backing up entire attributes of a file if it is determined that the file is resident and backing up attributes and data blocks belonging to the file if it is determined that the file is non resident.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 17-19 are flow charts for describing various aspects of serverless backup;

DETAILED DESCRIPTION

Figure 1A:
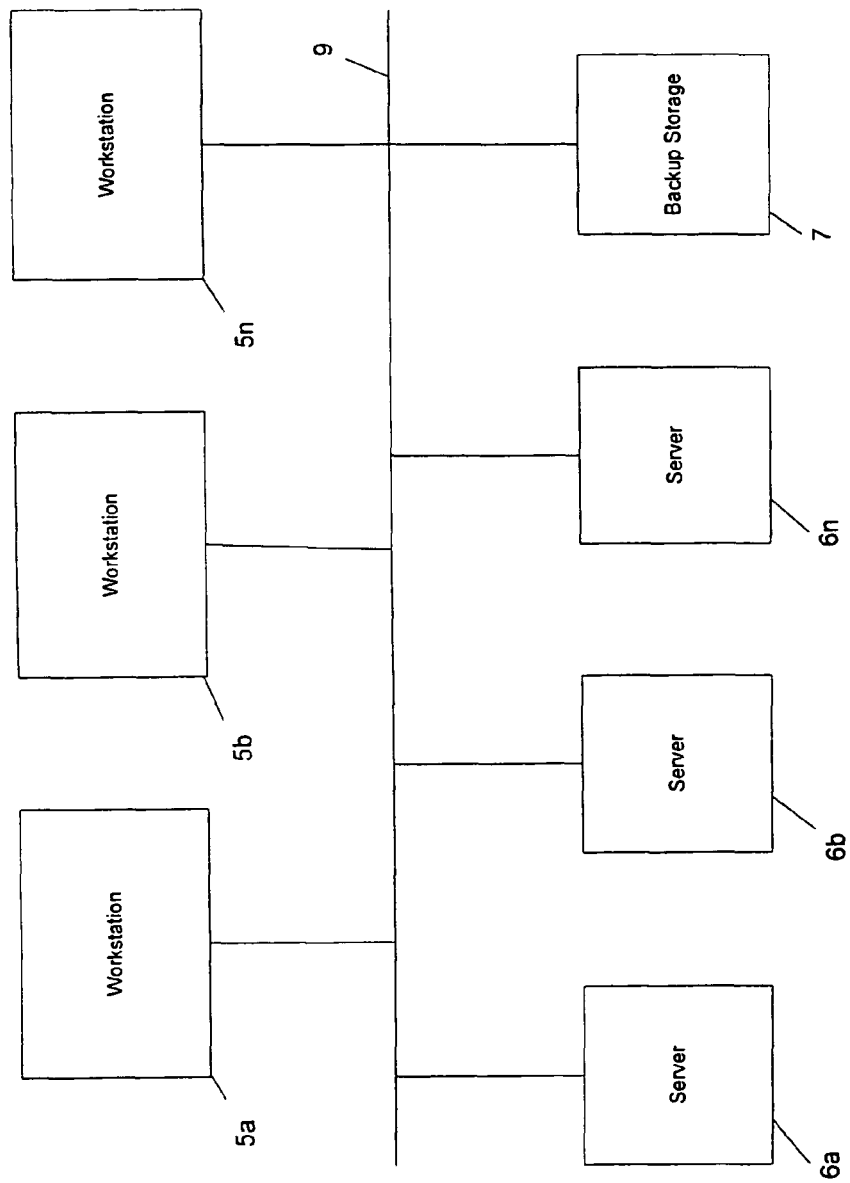
FIG. 1A is a block diagram of a LAN environment.
Figure 1B:
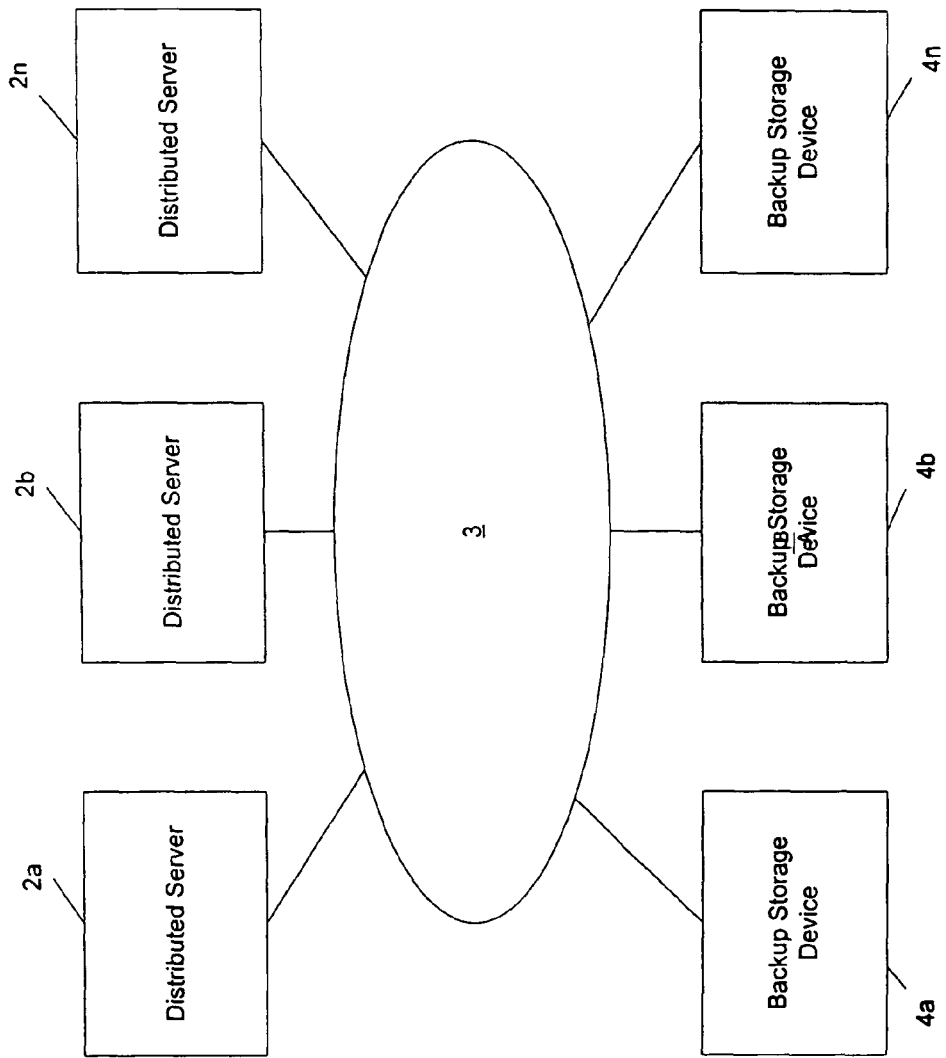
FIG. 1B is a block diagram of a SAN environment.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present system and method is capable of being implemented in a Local Area Network (LAN) environment as well as in various other types of environments including, for example, a Storage Area Network (SAN) environment.

Figure 2:
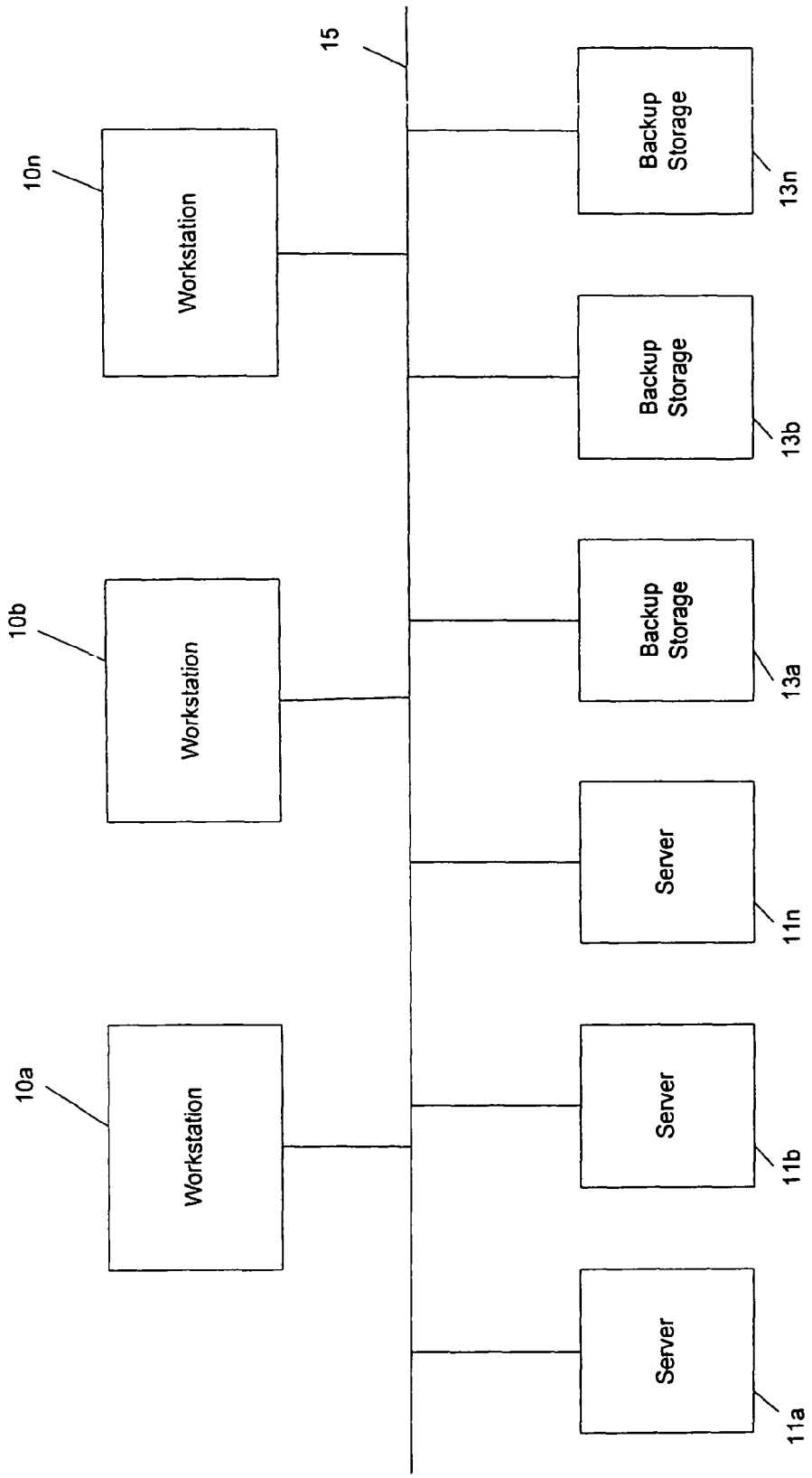
FIG. 2 is a block diagram illustrating an example of a network environment to which the present systems and methods may be applied.

FIG. 2 illustrates the hardware and software environment in which the disclosed embodiments will be further described. The system includes one or more workstations 10a-10n, one or more servers 11a-11n and one or more backup devices 13a-13n interconnected via one or more networks. The workstations 10a-10n and servers 11a-11n may user the same or different operating systems. The workstations 10a-10n may include one or more desktop computers, laptop computers, mainframes, etc. In the embodiment shown in FIG. 2, the network is a LAN environment, and the workstations 10a-10n, the servers 11a-11nin and the backup systems 13a-13n are interconnected via a LAN 15.

Figure 3:
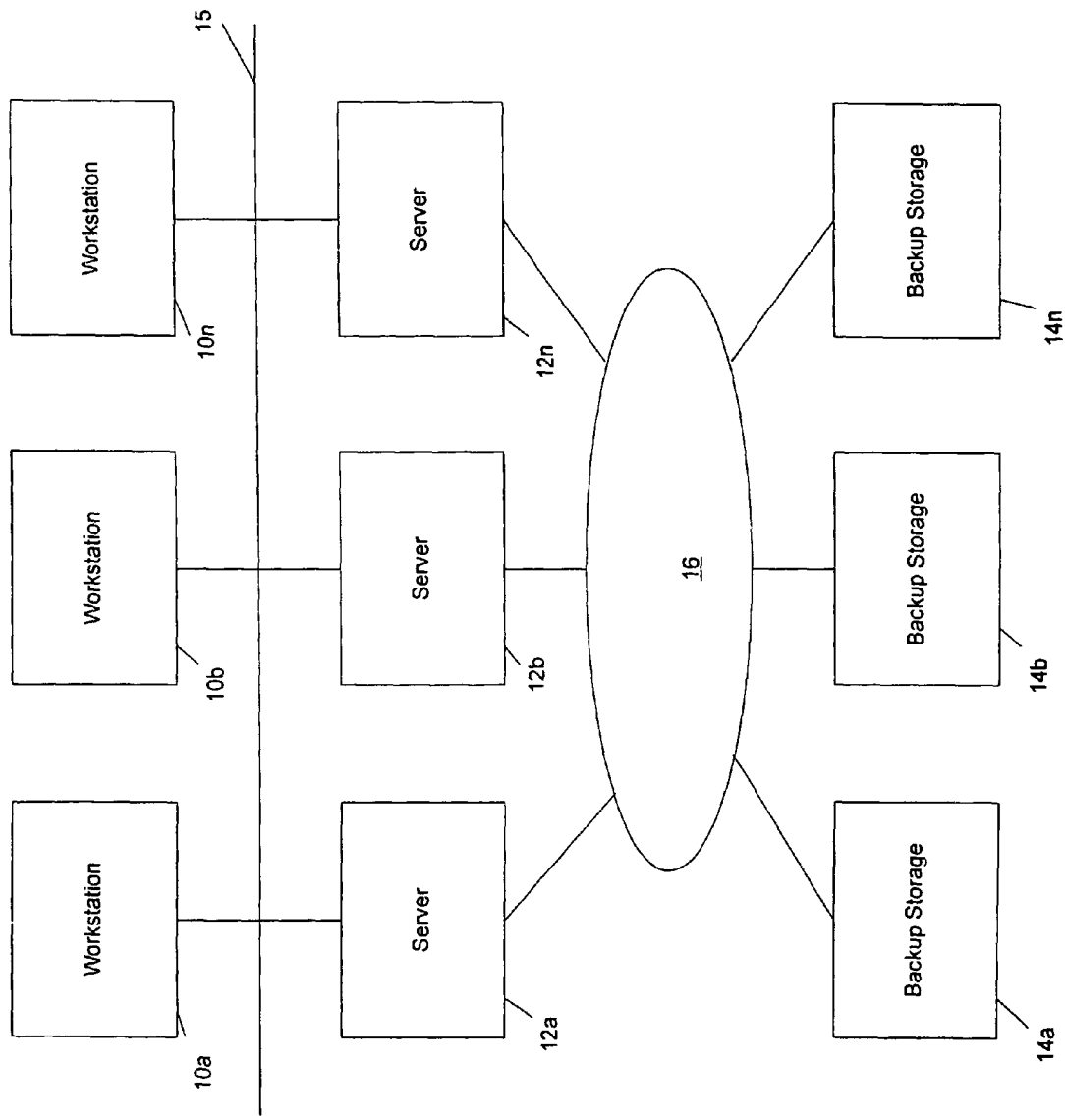
FIG. 3 is a block diagram illustrating an example of a SAN environment to which the present systems and methods may be applied.

In addition, or as an alternative to the above-described LAN environment, a SAN environment may be provided. In the SAN environment, the workstations 10a-10n may be connected to one or more of a plurality of servers 12a-12n via a LAN as described above with respect to FIG. 2. However, in a SAN environment, servers 12a-12n are connected to one or more backup storage devices 14a-14n via a network 16, as shown in FIG. 3. As will be described in more detail below, the servers 12a-12n may be assigned to server groups which include distributed servers, a primary server and backup storage devices. Network 16 is a high speed network that may include a system of switches and bridges forming a part of a fibre channel network. The SAN forms a high speed, high bandwidth system for communicating data. The high speed network 16 may be, for example, a fibre channel network, a shared SCSI system or an SSA type system.

Although only one server group will be described herein, a plurality of server groups may be provided on the SAN. The primary server controls the flow of information of all of the servers in that SAN server group. This prevents conflicts if two servers attempt to allocate a device or media at the same time.

Fibre channel adapters and fibre channel libraries may be connected to the network 16 and are referred to as nodes. Nodes may be connected to switch/hubs, creating a ring. The fibre channel ring, sometimes also called a fibre channel arbitrated loop, includes nodes connected by a fibre channel hub, so that each node can talk with each other node. Nodes log in to the ring when powered up or when first connected to the ring. This causes an event on the ring that all other nodes on the ring receive so that each is aware of new nodes. Each node on the ring is assigned a unique world-wide address or id by the manufacture, allowing each node to be identified when it logs onto the ring. Backup devices such as tape libraries connected to a hub use applications that are network-storage aware, so that they can access the devices without interfering with other applications also accessing the devices.

Figure 4:
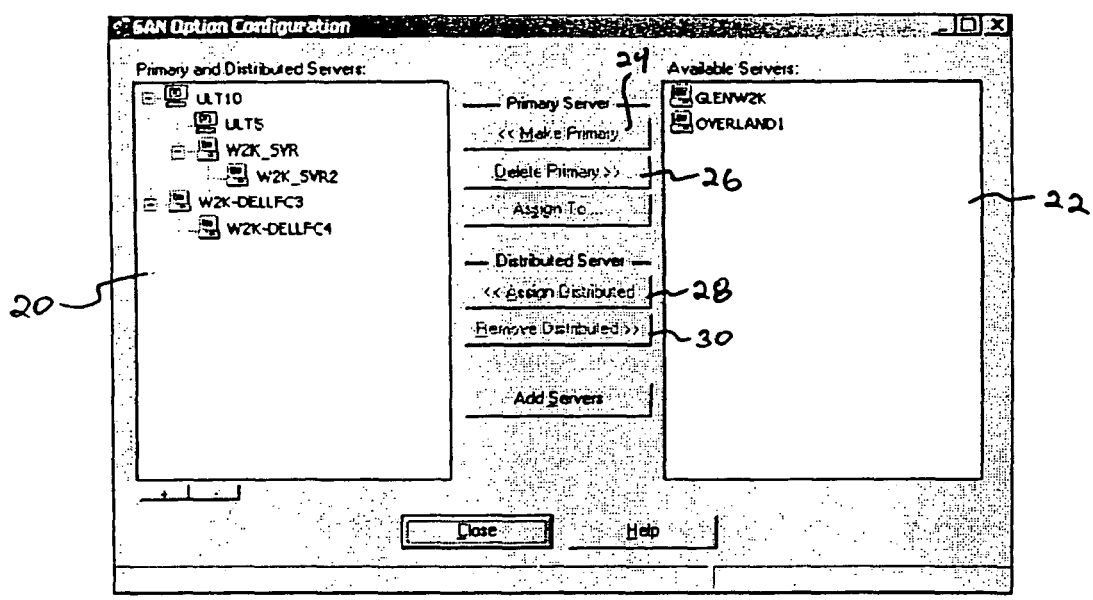
FIGS. 4 and 5 are screen displays for allowing a user to configure the system.

In the SAN environment described herein, software systems in accordance with the present disclosure are installed on the servers 12a-12n. The system is then configured to designate the primary and distributed servers and to assign each server to a group. For example, according to an embodiment, a display such as that shown in FIG. 4 is provided to a user. The display includes a panel 20 provided on the left hand side which provides a tree view of the configuration of primary and distributed servers. A panel 22 on the right hand side of the display shows all available servers having the present software installed and which have not yet been assigned to any server group. A user first selects the primary server, by moving the curser (not shown) and selecting one of the servers from the list on the right hand side of the display and then clicking a Make Primary button 24. The primary server may also be deselected by moving the curser and selecting the server from the left panel and clicking a Delete Primary button 26. After the primary server has been selected, the distributed servers are then selected and assigned to that primary server to form a server group. A distributed server is selected from the right hand window of the screen and the Assign Distributed button 28 is clicked. To remove a distributed server from a group, the server name in the left panel is selected and the Remove Distributed button 30 is clicked. This process is repeated until the server group is configured as desired by the user.

Figure 5:
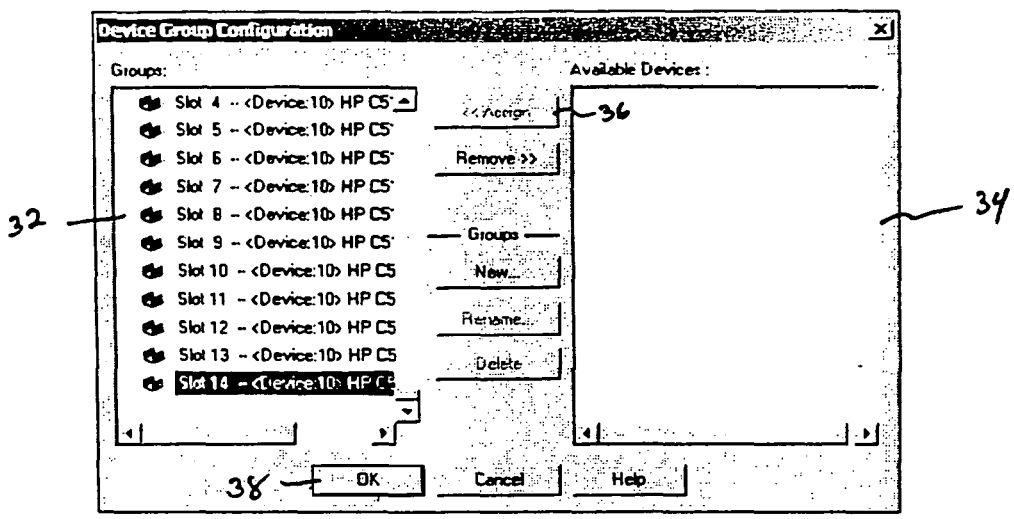

The storage devices are then assigned to the server group. This process is performed on the primary server. For example, to assign shared libraries to a server group, a Device Group Configuration dialog is selected from the primary server machine. This presents a window such as that shown in FIG. 5, which lists each of the server groups in the left hand panel 32 and available storage media devices in the right hand panel 34. Although the present disclosure will be described mainly by reference to tape libraries as the storage media devices, other types of storage media devices may be used as alternatives to or in addition to the tape libraries. Tape libraries not presently assigned to a group are displayed in the Available Devices right hand panel 34. To assign a tape library to a group, a library listed in the Available Devices panel 34 is clicked on and selected. The group in which the user wants to add the library to can then be highlighted in the left hand panel 32 by the user. The Assign button 36 is then clicked. The library will then be removed from the right hand panel 34 and placed beneath the device group in the left hand panel 32. Additional libraries can be added to the group by repeating the above steps. When finished, the OK button 38 is clicked.

Figure 6:
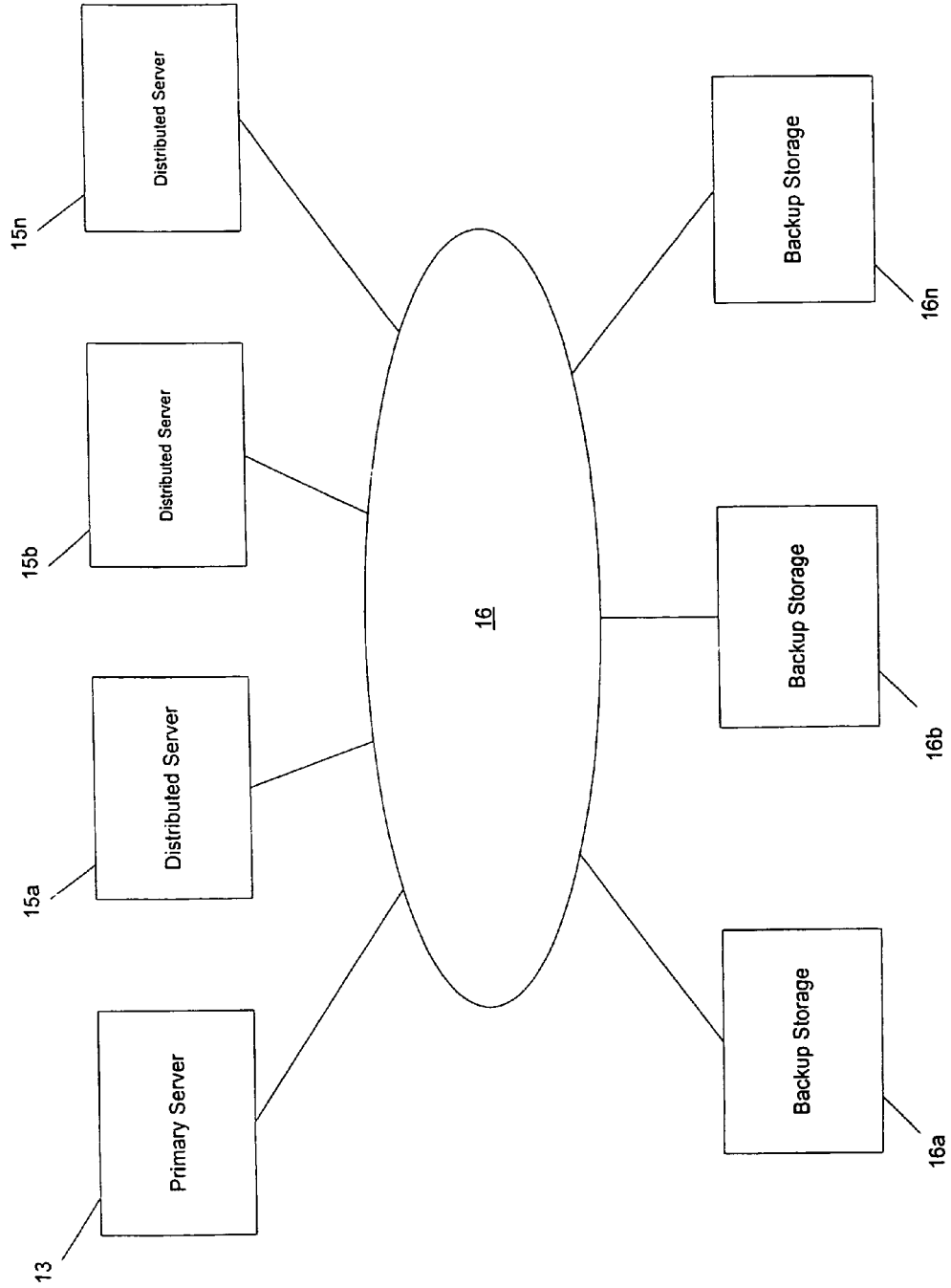
FIG. 6 is a block diagram illustrating a configured system.

An example of the thus configured server group is shown in FIG. 6. The network now includes a primary server 13, distributed servers 15*a*-15*n* and storage media devices 16*a*-16*n*.

Figure 7:
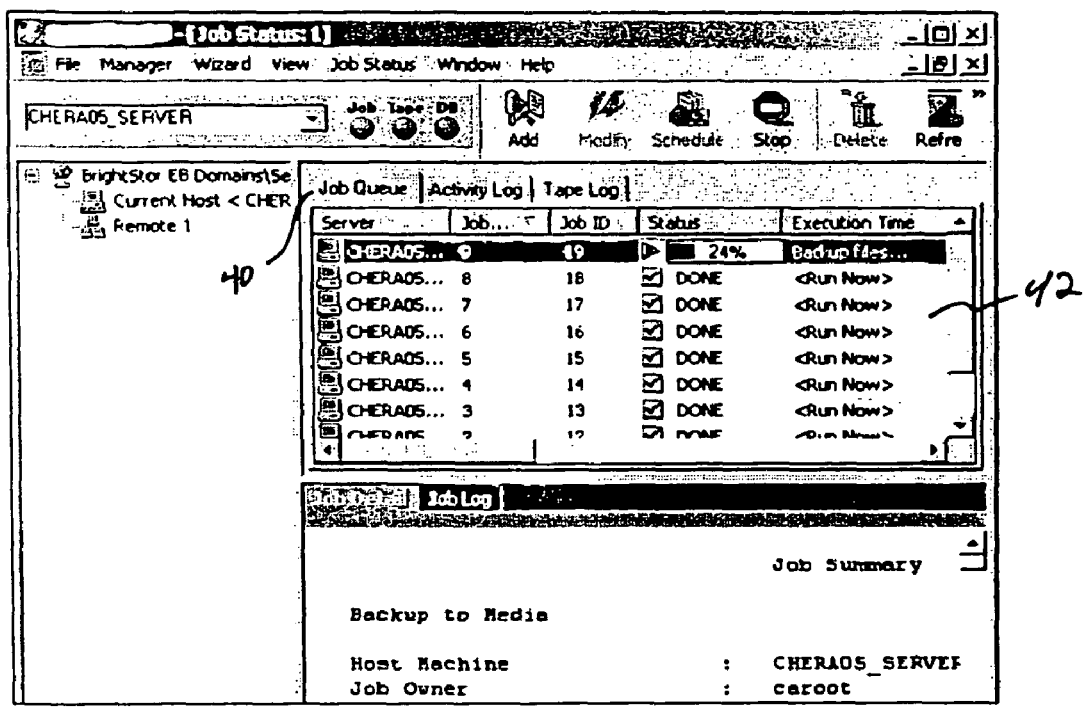
FIGS. 7-12 are screen displays allowing a user to set up jobs in a job queue.

Each server maintains a job queue of jobs that need to be performed. An example of a job queue is shown in FIG. 7. Clicking on the job queue tab 40, displays the job queue in window portion 42, as shown. The job queue identifies the server involved in the job, the job number, the job ID, the state of each job and the execution time for each job, as shown.

When a job is run or scheduled to run, it is submitted to the job queue by the user. The present system continuously scans the job queue for jobs that are ready to be executed. Jobs can be controlled by selecting a job from the job queue and right-clicking various control options. For example, the user can be given the option to change the job's status to HOLD or to READY (if it is currently on hold). HOLD signifies that the job is not scheduled to be executed. READY means that the job can be executed. The user can also quickly submit a job to the job queue by using a previously saved script. A script is a job that was saved to a file. The script contains the original source, destination, option, and schedule information for the job. The job can be modified to add options or additional sources to an existing job, without having to create a new job. The job can be rescheduled to quickly change a job's execution date, time, or status. This also allows a user to resubmit a Done job that is still in the Job Queue. For example, the user may want to do this if the job was not successful when it first ran. The user can also cancel an active job from the job queue and reschedule it for its next regular interval. A job can be cancelled and deleted from the job queue completely. Deleting a job will interrupt and remove the job completely from the job queue, and it will not be rescheduled. If the user then desires to reinstate the job, the user may recreate the job (if it was not previously saved to a script file).

Figure 8:
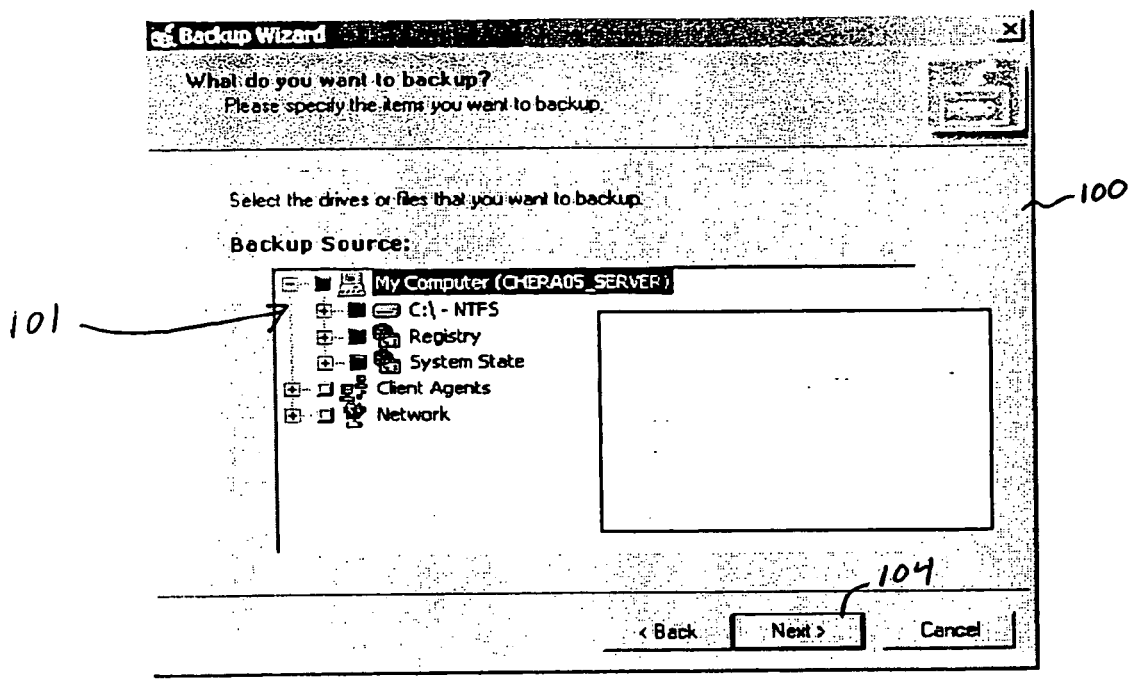
Figure 9:
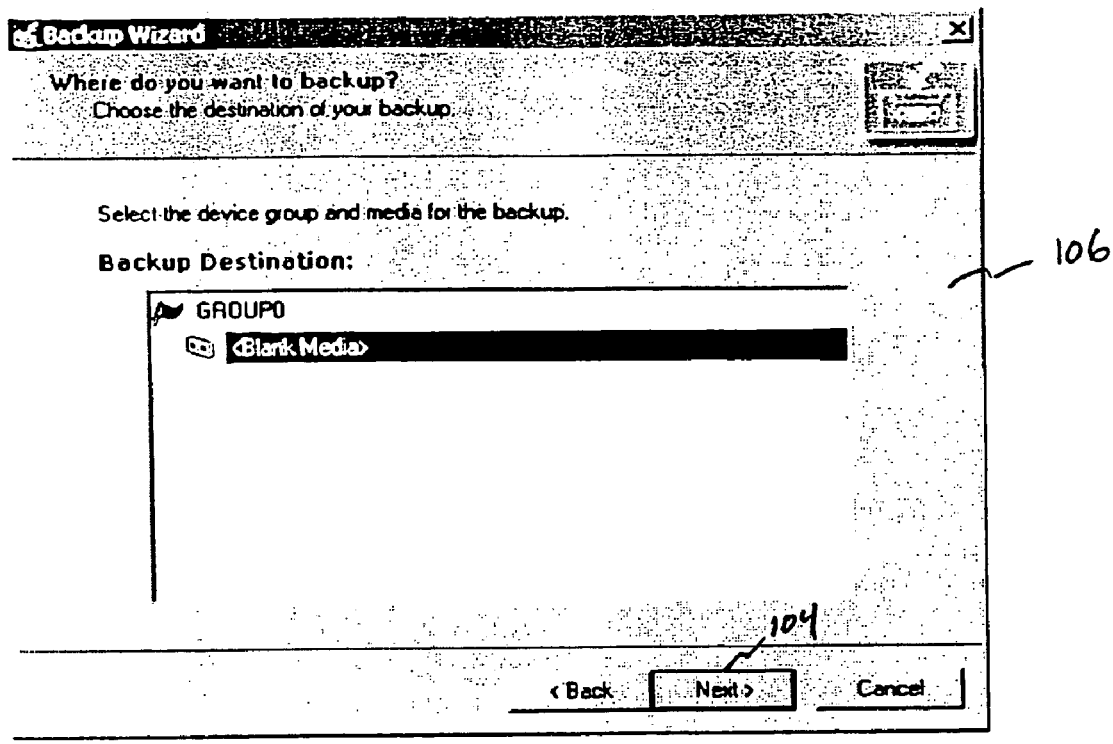
Figure 10:
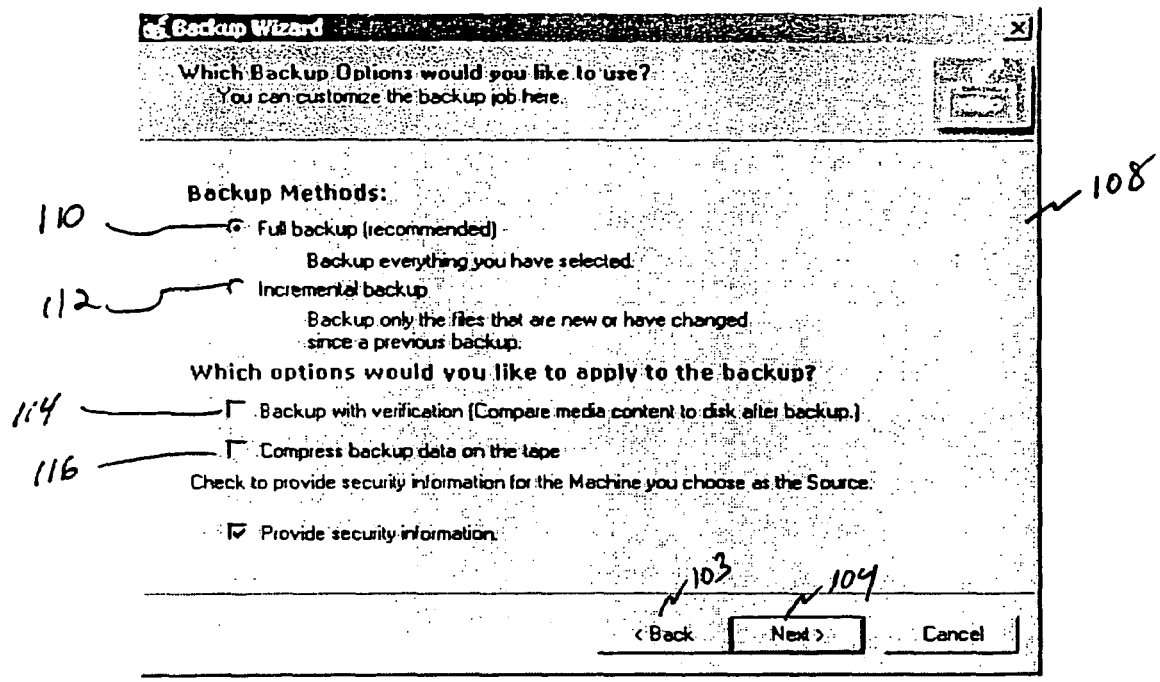
Figure 11:
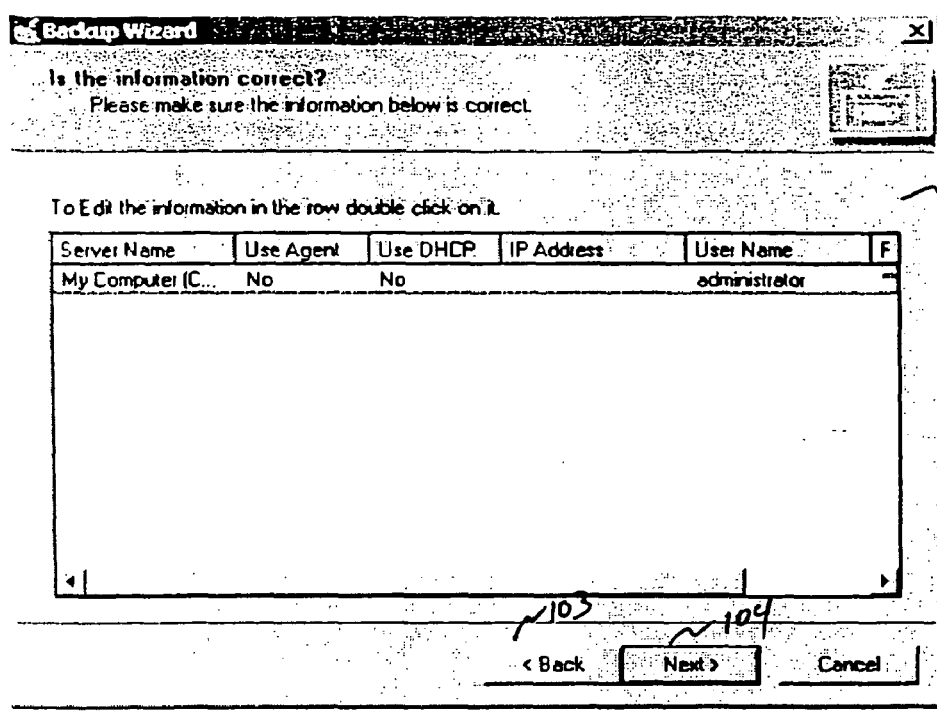
Figure 12:
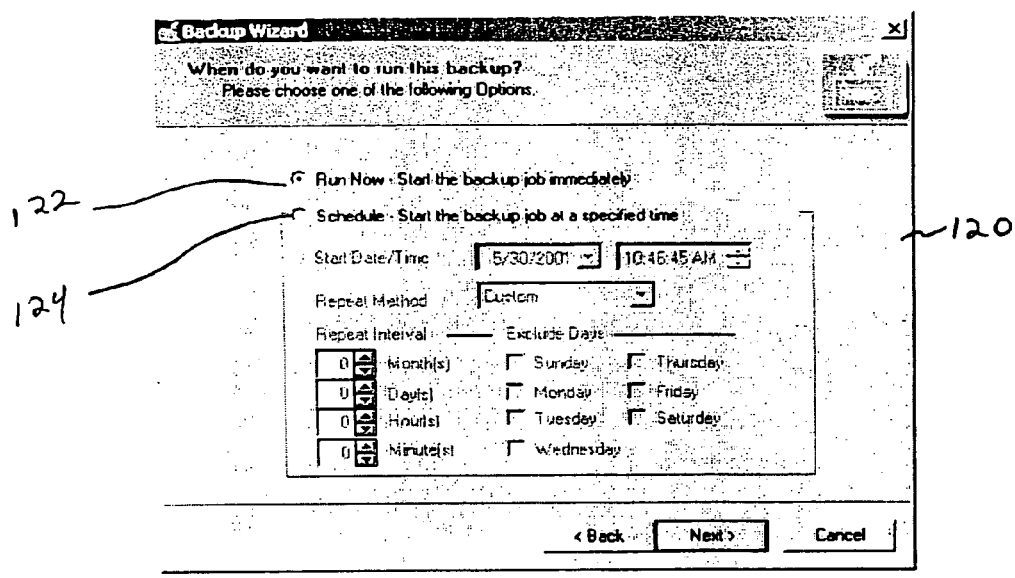

A user can set up jobs to be performed by adding them to the job queue. A backup manager allows jobs to be added to the job queue. For example, the user can set the source, destination and scheduling information for each job. By specifying the source, the user can specify the items they wish to backup. By specifying the destination, the user can specify where they wish to have the source information backed up. By specifying the scheduling information, the user can specify when they wish to perform the backup. The backup manager includes a backup wizard, which provides the user with various windows for selecting options and specifying the job queue information. The source, destination and scheduling information can be specified by use of the backup wizard For example, after the backup wizard is started, the user is requested to specify the source or server they wish to back up, by entering the Server name, user name and password. After the system validates this information, the user is presented with a window 100 such as that shown in FIG. 8. As shown, the browser displays a machine tree 101 from which the user can select domains, machines, volumes (drives), shares, directories and files for backup. For example, to backup the entire server machine, the user highlights "My Computer" and then clicks Next button 104. The system then displays a window 106 such as that shown in FIG. 9, requesting the user to choose the backup destination by selecting the media for the backup. After selecting the media for backup, the user clicks Next button 104. The user is then presented with the backup options screen 108, as shown in FIG. 10. This screen allows the user to customize the backup job by choosing the extent of the files that are to be backed up. For example, the user can select Full Backup 110 or incremental Backup 112. If Incremental Backup is selected, only files that are new (or have changed since the previous backup) will be backed up. This screen also allows the user to set whether to backup with Verification 114 and/or Compression 116. After clicking Next button 104, the user can be presented with a window 118 as shown in FIG. 11. This window shows the information that was input and asks the user to verify the information. If information is incorrect, the user can go back and alter any of the entries by clicking Back button 103. If the user is satisfied with the information, the user clicks button 104 and is presented with a window 120 as shown in FIG. 12. Window 120 allows the user to select whether the backup job is to be Run Now 122 or whether it is be Scheduled 124 to run at a specified date and time. If Schedule button 124 is selected, the user is presented with a series of options to choose a start date/time, repeat method, repeat interval (e.g., month, day, hour, minute) and days in which that backup job is to be excluded (if any).

The present system thus provides an easy and intuitive way of scheduling backup jobs. The present system also allows remote servers/machines in another server group or not associated with any server group to be backed up from a local server. The remote machine should have an appropriate agent on it so that it can be identified by the local server, and so that the data to be backed up can be retrieved and backed up. The agent on the remote machine browses targeted directories and packages data to be transported in pulses of large data packets to the local server. The local server then prepares the data to be stored on the designated storage devices.

Each agent may also include an access control list (ACL) identifying which local servers are able to backup or restore data through that agent. The access control list can identify specific users and/or IT addresses which are denied or allowed to backup/restore data through the agent.

The present system provides a security system which relies on the user having logon credentials on the node that the agent is deployed on. The connection from the local server to the machine having the agent (agent node) is established only if the user has login access to that agent node. The present system also provides an added level of security since the user should have physical access to the agent node (over and above the login access) in order to successfully operate on that node.

The ACL defines for a particular agent node the system servers (on the enterprise network) that can connect to it and access its functionality. The functionality is set on the node which hosts the agent and requires physical local node access in order to be manipulated. The ACL allows the user of that node to either set an include list or an exclude list of servers that can access it. By default the ACL can be set to grant all servers access to the Agent.

In order to change the ACL of a particular agent, the user locally logs in to that node and manipulates the ACL via an Agent admin utility. Users can invoke the agent admin utility and add or remove access requests via an Access Control List Dialog.

Figure 13:
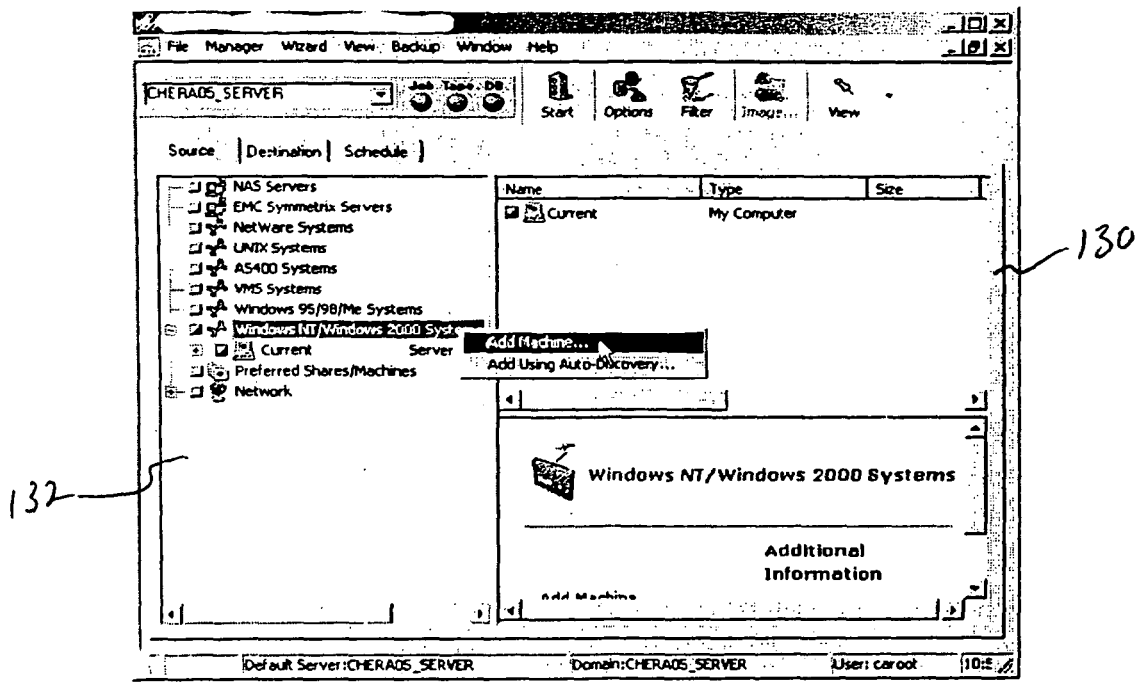
FIG. 13 is a screen display allowing a user to backup a remote server.

An example of adding a remote server for backup will now be explained by reference to FIG. 13. A backup manager screen 130 is presented to the user of the local server. In this example, the remote server to be backed up is a server that is running Windows NT. The user highlights the "Windows NT/Windows 2000 System" from window 132 as shown, and clicks on it. The user is then presented with the option to "Add Machine" or "Add Using Auto-Discovery", as shown. Clicking on Auto-Discovery will find machines that have the appropriate agents on them. For example, in this example, if Auto Discovery is selected, the system will find machines on the network that have the Windows NT/Windows 2000 system agents on them. Selecting the Add Machine as shown, the user is presented with a series of dialog boxes, allowing the user to enter a host name for the remote server/machine, and asking for a user name and password entitling the user to browse the remote server/machine and perform backups on it and allowing the user to set the destination for the backup.

Figure 14:
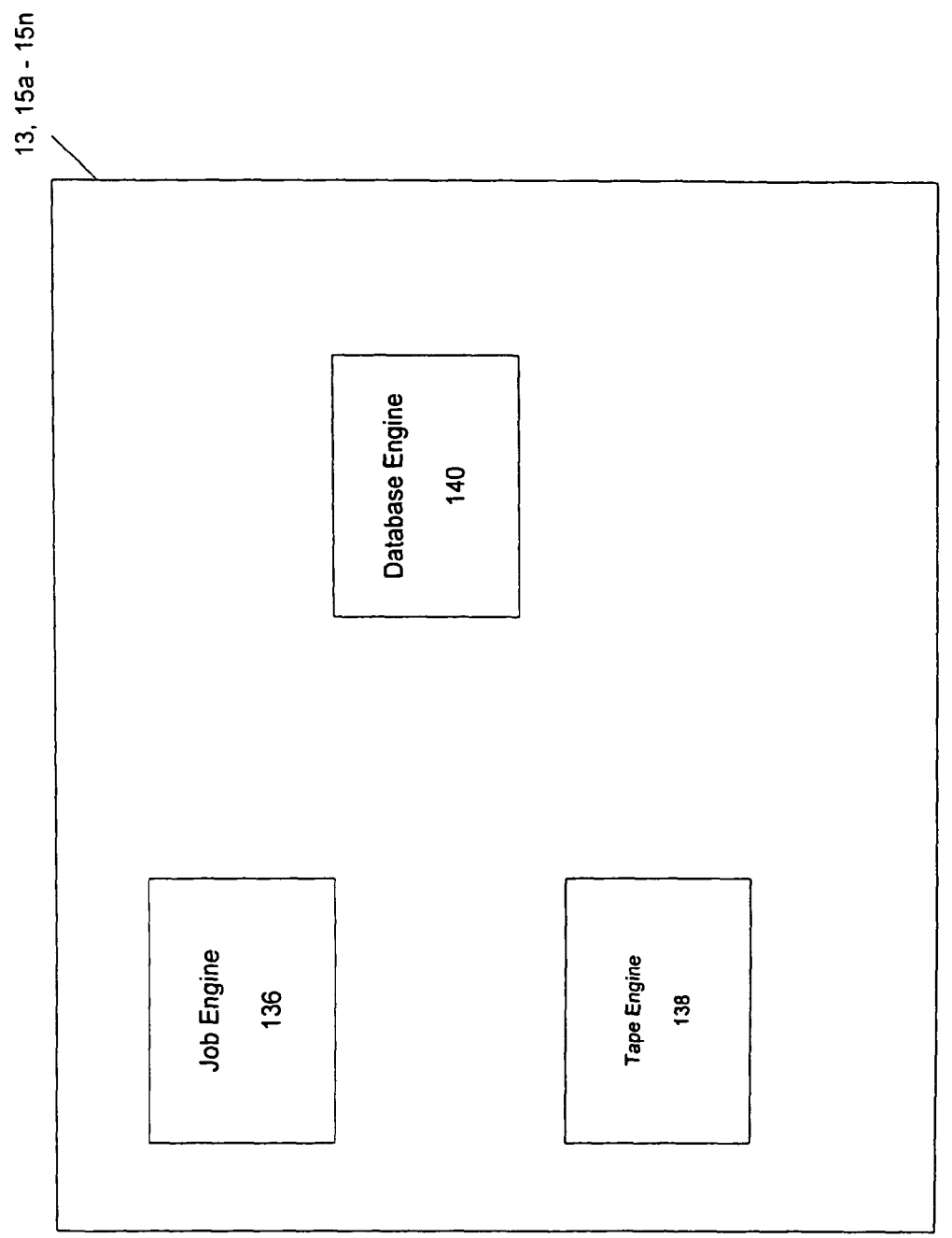
FIG. 14 is a block diagram showing various engines used by the servers of the present system and method.

Each server of the present system may include engines for performing various functions for backup, restore, etc. For example, as shown in FIG. 14, each server may include a Job engine 136, a Tape engine 138 and a Database engine 140. These engines perform the workload for the present system, processing and monitoring backup and restore operations and updating information regarding performance in activity logs and databases.

The job engine processes jobs in the job queue at the designated dates and times. The job engine scans the job queue for a job that is ready to run, and then sends it to the appropriate handler. Each server running the job engine can be configured to suit each user's needs. The job engine thus controls the execution time of jobs in the job queue. It scans the job queue regularly, launching jobs as their execution dates and times are reached. Various features of the job engines can be user controlled. By choosing a select configuration menu, for example, various options can be configured. For example, as noted above, the job engine constantly scans the job queue for jobs that should execute. By default, the job queue is scanned every 10 seconds. To change this time interval, the user can specify a time interval number from 1-999 seconds. The retention time for done jobs can also be controlled. That is, jobs with a final status of "DONE" will remain in the job queue for the time specified in this field. By default, DONE jobs are kept for 24 hours before they are deleted from the queue, unless they are recurring jobs. To change this time, a number between 0 and 999 can be input.

The system may also include an Activity Log which can be viewed by the user. The Activity Log contains information about all of the system's activities. By default, notes, warnings, and errors that occur when running the present system appear in the Activity Log. To change the types of messages that can be maintained in the Activity Log, the user can specify the following values: "None" so that no messages appear; "Errors" so that only errors that occur while running the present system will appear; "Warnings & Errors" so that warnings and errors that occur while running the present system will appear; "Notes, Warnings & Errors" (which is the default value) so that all notes, warnings, and errors that occur while running the present system will appear; "Debug" so that debug information appears which can be used for troubleshooting purposes.

The tape engine is responsible for communicating with and controlling the storage devices. The tape engine selects the device needed for a job. That is, the tape engine identifies all the storage devices that are connected to the system and activates them when a job is started. Changing the configuration of the tape engine is not recommended. Normally, a default configuration is used, except for troubleshooting purposes. However, the present system provides various tape engine options. If a "Level" option is kept at the default ("None"), the user does not need to specify anything else. However, if desired, the following values are available: "None" (default) in which no information is logged. If the default is kept, a Tape Engine Log will not appear in a Job Status Manager. If set to "Detail," each message sent by the storage devices will be logged, with the system monitoring the tape engine and logging all information received. If an "Engine Log" option is selected, the Tape Engine Log will appear in the Job Status Manager. If "Output" is specified and "Detail" is set as noted above, the user can specify where they want the messages sent. The user can specify one of the following: "Both Screen and File" in which case the messages are recorded in the Tape Engine Log as well as being sent to a DOS box (a Tape Engine Message window). If "Screen Only" is specified, the messages are sent to the Tape Engine Message window only. If "File Only" is specified, the messages are recorded in the Tape Engine Log only. The user can view the Tape Engine Log in the Job Status Manager.

All operations performed within the system are recorded by the Database engine. The Database engine is responsible for maintaining a history of files, directories, drives, and machines that the system has backed up or copied. The Database engine is also responsible for maintaining information about the jobs that have been processed by the system, such as the job type, logs, the final result and the start and stop times of the jobs. The Database engine also maintains a history of the media used by the system, such as its type, its name, the date it was first formatted, the date it expires and the sessions on it. The Database Engine stores statistical information for all jobs processed. Some of the job information saved includes what files and directories have been backed up, copied, and restored, jobs that the present system has processed, storage devices and the media used for the jobs.

Various database engine options can be user controlled via a user interface. For example, a "Minimum Free Disk Space Required (M Bytes)" option allows the user to specify the minimum amount of disk space (in megabytes) the user wants to reserve for the system database. By default, 5 MB of disk space is specified. To change the amount of disk space required, the user can specify a number between 1 and 10. An "Enable Database Pruning" option can be set so that information regarding the files and directories that were backed up or copied in a session can be deleted when database pruning is on. By default, this option is selected, in order to free up space in the database file. However, the user may find it useful to set this option off in order to maintain the detailed information, for restoring purposes at a later time. However, it should be noted that not pruning the database can mean that the database may fill up quickly. A "Prune Database Records Older Than _Day(s)" option is active only if the Enable Database Pruning option is on. The user can specify how long the record should be in the database before it is deleted. By default, the record will be deleted (if enabled) after it has been in the database for 30 days. To change the length of time, the user can specify a number between 1 and 365. A "Run Database Pruning at _" option is active only if the "Enable Database Pruning option" is on. This option allows the user to specify when the pruning operation is to be run. By default, pruning (if enabled) will occur at 12:00 AM. A "Delete Media-Related database Records ONLY when Pruning" option may also be provided. When the user reformats or erases a media, the present system will delete the records in the database that pertain to the tape. Performing this extra step, however, can be time-consuming process. Accordingly, the user can select the "Delete Media-Related database Records ONLY when Pruning" option to postpone deleting these records until pruning is performed. A "Submit Database Pruning now" option allows the user to immediately submit a database pruning job to the job queue with the specified parameters. An "Enable Remote Database" option enables the server to use a remote database as its database, regardless of the remote database type. This database can be used to submit a restore job to a local machine. Configuration of the remote database is performed here as well. The user enters the Server Name, Login Name, Password and Server Operating System type of the remote database the user wants to enable.

The present system may also include several other types of managers for managing the system. A Restore manager restores data that has already been backed up by the present system. A user can set policies to schedule and manage the restore operations. The Restore manager can perform a complete or partial restore of data.

A Database manager displays information from the database, such as the jobs processed by the present system, the media used, and the devices that are being used by the system.

A Job Status manager monitors all pending, completed and active jobs from a Job Status Manager window. The Job Status manager also reschedules pending or completed jobs, submits new jobs, deletes jobs and stops active jobs in response to a user request. Log information is provided for each completed job.

A Devices manager displays information about the storage devices and media. The Devices manager allows a user to change a drive's compression mode, and perform media functions such as compression, formatting, erasing, ejecting and retensioning.

A Report manager generates reports from data in the database. Various reports include information about schedule policies, media errors, sessions, backup devices and media policies.

A Media Pool manager manages, creates and maintains logical groupings of media for easy identification of backups, allowing efficient scheduling of the maintenance and recycling of the media. The user can design media rotation schemes to suit the particular archive needs. Reports detail the media information for media pools used in the rotation schemes, including media status and session information.

An Alert manager sends messages to people in an organization using various methods of communication, regarding events that occur during the functioning of the present system.

Each time a backup job is run, the system records information in its database about the machines, directories and files that have been backed up, and the media that was used. This allows a user to locate files whenever the user needs to restore them. The database information is backed up by default whenever a user backs up the systems home directory. A user can select to backup the database files in every backup job regardless of whether the system home directory is selected for backup.

The present system also offers several utilities that can be used to manage files. For example, database recovery can be performed, should the data in the database be corrupted for any reason. A Recover Database utility lets a user restore information from a database backup to the database, overwriting existing database files. A user can use this utility any time the database files are lost, such as during a disaster like a fire, flood or machine crash. Several advanced database recovery options are available, including an option to specify a date to restore the database. In this case, the database session created on or before this date will be used for backup. Another option allows the user to specify media options for the job. Another option allows the user to run commands or batch files before and/or after the restore job. An option is also provided allowing the user to determine the level of detail to record in the Job Queue Log.

A merge utility may be provided, allowing information to be inserted into empty slots within the database. This function allows a user to restore data from a different server than the one where the database resides. For example, if a database backup was created using the present system on a different machine, the user can use the Merge utility to get the media information into the database in the systems home directory. The Merge utility thus allows a user to take a media that contains one or more backup sessions and append the information from that media to an existing database. This is useful if detail information has been pruned from the database. Advanced merge options include an option to specify media options for the job, an option to run commands or batch files before and/or after the job, an option to determine the level of detail the user wants recorded in the Job Queue Log and an option to send messages about events in the operation.

A Scan function provides information about any media backup sessions. Each source that is selected to back up is saved on media as an individual session. A user can scan a single session or an entire media. Results of a scan job can be seen in the Job Queue. This function is particularly useful if a user is trying to recover a server and needs to find the most recent backup of the database so that it can be restored. A user can also use the Scan function if they want a list of the files that were backed up. Advanced scan options include an option to specify media options for the job, an option to specify some general options for the job such as to scan files with CRC verification, or to enable database recording, an option to run commands or batch files before and/or after the job, an option to determine the level of detail the user wants recorded in the Job Queue Log and an option to send messages about events in the operation.

A compare function compares the contents of a media session to files on a machine. Results of the Compare job can also be seen in the job queue. A user can use this feature after a backup to verify that the backup copied all of the files to media without error. Advanced compare options include an option to specify media options for the job, an option to specify whether or not to enable database recording, an option to run commands or batch files before and/or after the job, an option to determine the level of detail the user wants recorded in the Job Queue Log and an option to send messages about events in the operation.

A count function counts the number of files and directories on a machine. The results of the count function can be seen in the job queue. This option can be used after a copy job to verify that the copy function copied all of the files from one disk to another without error. Advanced count options include an option to specify whether or not to enable database recording, an option to run commands or batch files before and/or after the job, an option to determine the level of detail the user wants recorded in the Job Queue Log, an option to scan files for viruses before they are counted and an option to send messages about events in the operation.

A purge function allows a user to delete files and directories from a machine. Results can be seen in the job queue. The purge function allows a user to delete files and directories from a machine. Advanced purge options include an option to specify some general options for the job such as to remove directories or enable database recording, an option to run commands or batch files before and/or after the job, an option to determine the level of detail to record in the Job Queue Log and an option to send messages about events in the operation.

A copy function allows a user to copy files from one location to another. For example, a user can run a copy job on a local machine to store files and directories on another machine that is going to be backed up to media. Copy options determine related actions that occur during or after the copy operation. For example, an option is provided to specify when to retry open files and file sharing options. An option is also provided to specify whether or not to enable database recording. Another option creates a mirror image of the source machine on the destination media. An option is provided to copy files and directories from the source machine delete all files and directories that do not appear on the source machine. An option is also provided to delete files from the source machine after copying to the destination machine. An option is available to copy the file-level security information for file access on NTFS volumes. An option is also provided to run commands or batch files before and/or after the job is run. An option allows the user to determine the detail they want recorded in the Job Queue Log. Another option scans files for viruses before they are copied. Another option sends messages about events in the operation.

The present system allows data to be backed up by running storage operations in parallel utilizing multiple streaming. That is, the present system can be arranged to create multiple streams of backup for a backup job, based on the availability of tape devices, automatically or in response to a user selected option. By distributing the data across parallel streams, this approach greatly reduces the time required for backup operations. Recovery after a catastrophic loss will also be faster, since all available devices collaborate to restore all or most of the backup data at once.

Multiple streaming thus allows users to take advantage of all the available tape devices on the system, by splitting a single backup job into multiple jobs using two or more of the tape devices. As a result, multiple streaming increases the overall backup throughput compared with sequential methods. If more than one drive and more than one volume in the system are available, the user can choose to utilize multiple streaming.

Multiple streaming works for both local and remote devices. Backing up a remote source using the multiple streaming option is supported at the node (computer) level. A user can use all of the storage media devices, or can specify only a single group of storage media devices (if there are mixed types of storage media devices in the system). If a library option is installed on the system (as will be described below), multiple streaming (when selected) will use all of the available library devices. If the library option is not installed, the user may put the storage media devices into separate groups.

The total number of streams (slave jobs) created will depend on a number of storage media devices available, if it is a changer, otherwise, it will depend on the number of storage media device groups.

Multiple streaming is performed at the volume level for regular files (two volumes can run simultaneously on two separate devices), and at the database level for local database servers. Multiple Streaming is performed at node level for Preferred Shared Folder, remote database servers and Windows NT/2000 Client Agent.

The system can have as many jobs running simultaneously as the number of devices/groups that are on the system. When a multiple streaming option is selected, when one master job is created by the user, it will trigger slave jobs for as many volumes or devices of storage media as are available. When a job is finished on one volume, another job is executed until there are no more jobs to run.

When utilizing multiple streaming, the user may wish to select a media pool, to prevent tapes from being overwritten. Separate tape devices should be configured in separate groups for regular drives. For tape systems with changers, they can be configured to be in the same group. Canceling a master job, implies canceling all the slave jobs. The user can cancel the master job or any one of the slave jobs to cancel the whole multiple streaming job completely. As described herein, when a job is put into the job queue, operations may be performed before or after the job is performed. For example, messages may be sent to various personnel, etc. These are referred to as pre/post operations. The pre/post operations and comments are supported at the master job level. That is, pre/post operations will not be performed for each slave job. Instead, the pre/post operations are performed before or after the complete job that spawned the slave jobs is run Each slave job will have a default job description in the job queue with this pattern: MULTI STREAM [JOB [MID]] SUBJOB [SID], where MID is the master job id and the SID is the sequence id. The Multi Stream option will be ignored if the system has only one storage media device. In order to achieve the optimum performance with multiple steaming jobs, a high-end server machine with multiple processors and at least 256 MB memory per processor may be utilized.

Figure 15:
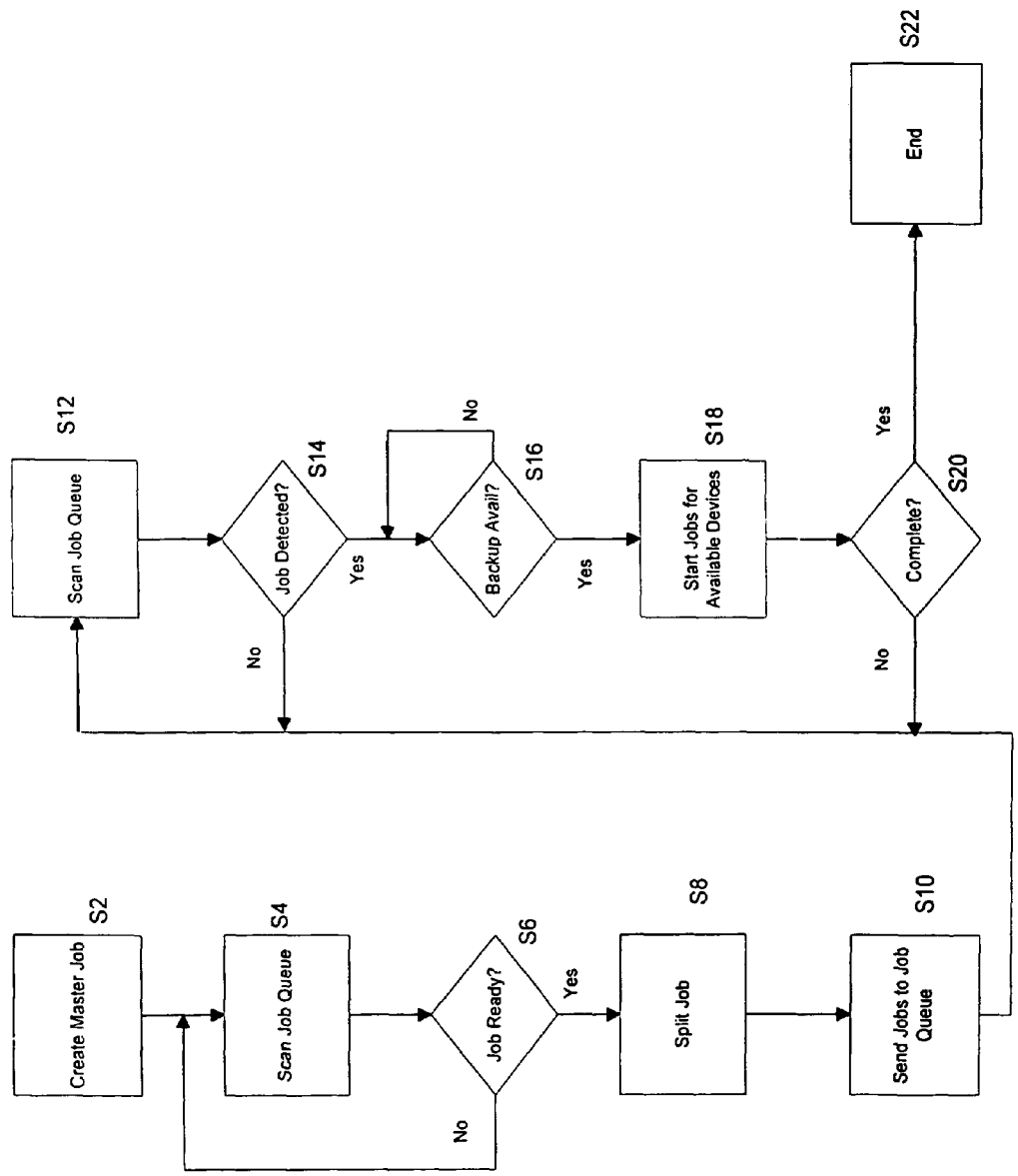
FIG. 15 is a flow chart for describing multiple stream backup according to an embodiment.

FIG. 15 is a flow chart for describing a multistream back up method according to an embodiment of the present disclosure. In Step S2, the user creates a master back up job. In step S4, the job engine scans the job queue, looking for jobs that are ready to run based on their scheduled run dates and times. In Step S6, a determination is made whether there is a job to run, based on the scheduled start times. If it is not time for a master job to run (No, Step S6), the job engine continues scanning the job queue until it is time for the master job to run (Yes, Step S6). In Step S8, the system splits the master job into multiple smaller slave jobs, with each slave job corresponding to a backup/restore of a single source entity (file system, database, etc.). The system then sends the smaller slave jobs to the job queue (Step S10). In Step S12, the job engine continues scanning the job queue for jobs. This continues until the new slave job is detected (Yes, Step S14). When the new slave job is detected, the job engine communicates with the tape engine to determine if a tape device is available to begin backing up to (No loop, Step S16). This continues until a tape device is determined to be available. Once a tape device is determined to be available (Yes, Step S16), the smaller slave jobs are started for each job having an available storage device (Step S18). As each slave job completes, information is returned back to the tape engine to indicate that the tape device used by the slave job is again available (Step S20). The job engine then scans the job queue for the next slave job and the process repeats until all slave jobs have been performed. A determination is made whether all jobs have been completed. If not completed (No, Step S20), the process again scans the job queue looking for a slave job to perform (Step S12). If each slave job is complete (Yes, Step S20), the process ends (Step S22) and the master job is deemed complete. At this time, any post job operations may be performed.

The present system is also capable of performing serverless backup, which solves many traditional backup related issues for system administrators. Serverless backup allows a user to perform backups with almost zero impact to the system CPU and allows applications on servers to continue to run while the backup is in progress. Serverless backup eliminates the need for a backup window, giving the highest possible backup/restore performance and allowing applications to continue to access the data while the backup is being performed.

Serverless backup is implemented using the industry standard extended copy command, and supports SAN environments with devices that support the extended copy command.

By using the extended copy command, serverless backup effectively eliminates the server completly from the data backup transfer path, and achieves direct disk to tape or tape to disk data transfer. Initiating the data transfer is the only activity that happens at the server level, with the actual data transfer happening at the Data Mover level on the SAN. The serverless backup according to the present disclosure transfers data between disks and tapes using "Data Movers." Data Movers are devices that support the extended copy command, eliminating the need for bringing the data all the way to the server, achieving the shortest data path. This enhances the backup performance considerably, and yields the highest possible backup/restore speeds. This allows the applications to continue to access the servers while the backup is in progress. This functionality eliminates the need for a backup window, and allows systems administrators to perform a backup at any time.

Figure 16:
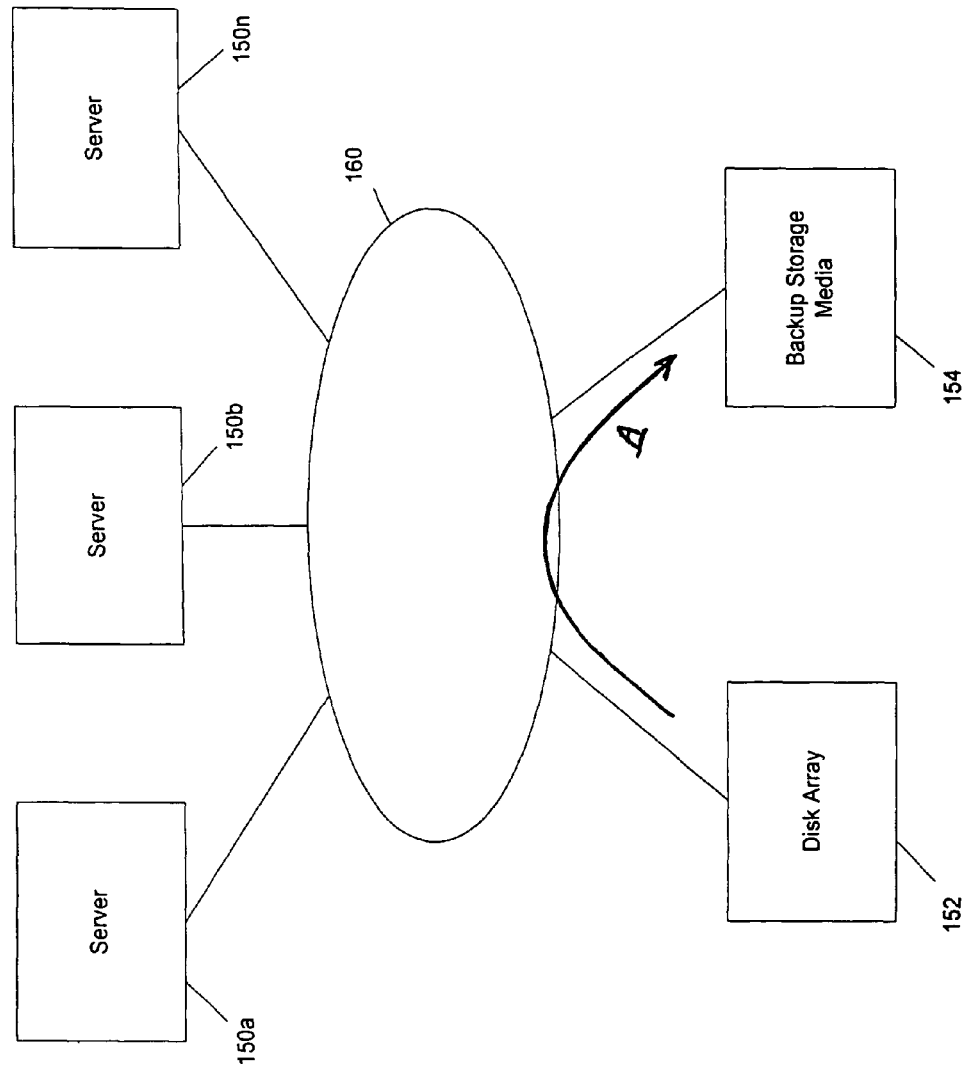
FIG. 16 is a block diagram for describing a serverless backup.

An example of a system for serverless backup is shown in FIG. 16. As shown, the system includes Servers 150a-150n, disk array 152 and backup storage media 154 which are all interconnected on the SAN via a high speed network 160 which may include routers, bridges, etc. Disk array 152 is capable of storing data from various workstations (not shown).

The SAN supports "extended copy" in which the data can be sent directly from disk array 152 to backup storage media 154, without having to go through a server. As shown by arrow A in FIG. 16, the data path for the backup of data starts at the disk array 152, travels through the network 160 and arrives at the backup storage media 154. Since the data path does not include the use of a server, the backup is considered serverless.

The only way that the servers are involved are to receive data regarding the backup. For example, the servers may communicate with various portions of the system to get metadata about the backup, etc. The servers may also be used to start and control the backup process, but the data being backed up moves directly from disk array 152 to backup storage media 154 without going through any server's CPU.

Figure 23:
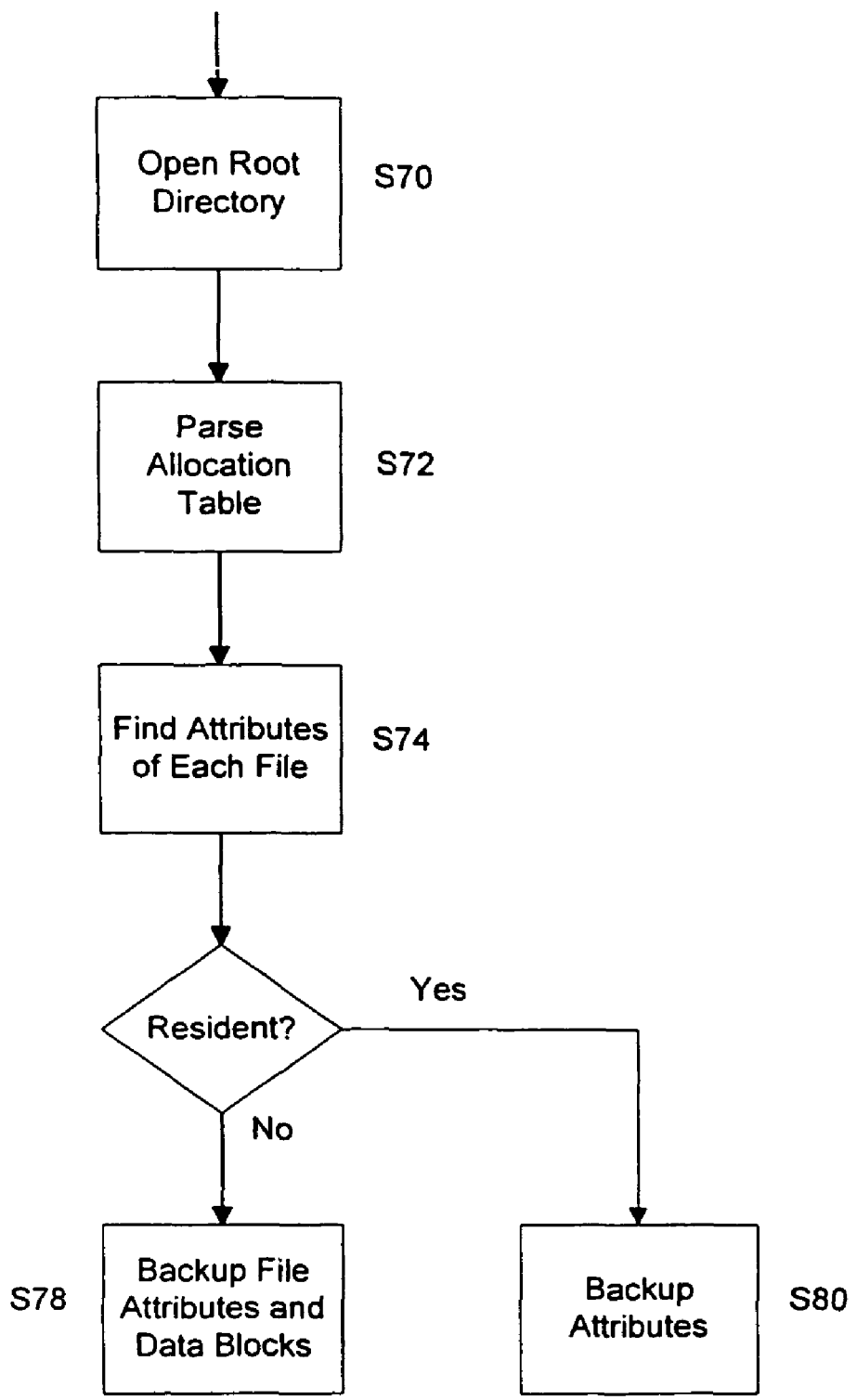
FIGS. 23-25 are flow charts for describing serverless backup operations.

One aspect of the serverless backup is based un parsing file-mapping tables of each volume. FIG. 23 is a flow chart for describing aspects of serverless backup according to an embodiment of the present disclosure. The system first opens up the NT file system (NTFS) root directory and structure (Step S70), parses the same for allocation tables of each file (Step S72), and finds out attributes of each file (Step S74). Upon examination of the attributes of each file, the system determines whether the file is resident or non resident (Step S76). If the file is resident (Yes, Step S76), entire attributes are backed up (Step S80). If not resident (No, Step S76), the system backs up the file attribute (or attributes), as well as the data blocks that belong to the file (Step S78), thus mapping the entire volume for all files residing on the volume for complete data protection. On a system supporting file allocation table (FAT) file systems, the system can translate the blocks by translating the FAT schema. The resulting scheme is a Serverless backup using extended copy technology capable of providing file level restores.

Figure 24:
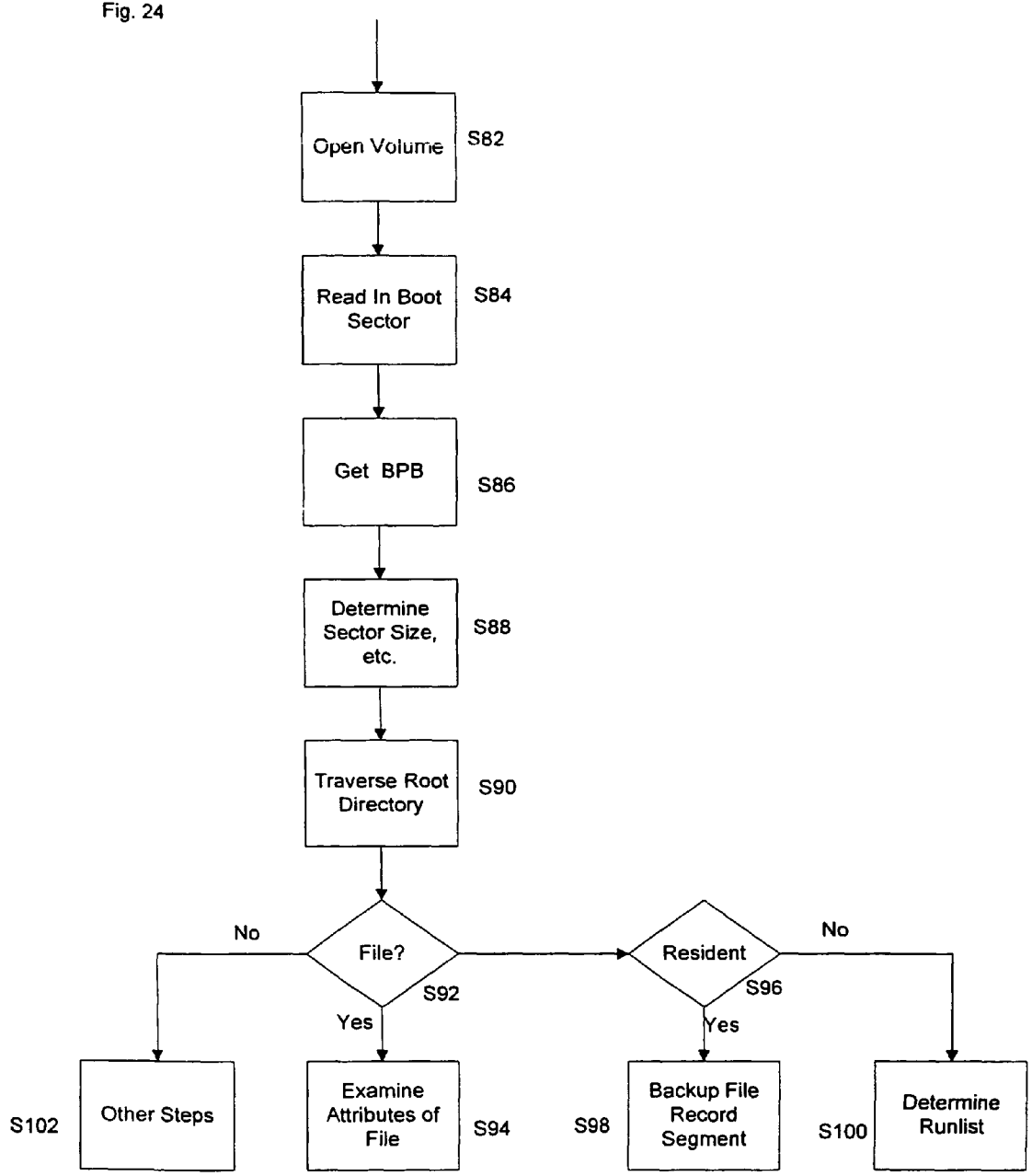

As shown in FIG. 24, for NTFS, the present system opens a volume (Step S82), reads in the boot sector (Step S82) and gets the bios parameter block (BPB) (Step S86). The system then determines the sector size, cluster size, file record segment size, clusters per Index Allocation Buffer (Step S88).

The system traverses the root directory first (based on the file reference of root directory, the system reads the file record segment for root directory), depending on the index root entry (Step S90) and determines if it is a file (Step S92). If it is a file (Yes, Step S92), the system will examine the attribute of the file (security, data attribute etc), and backup the corresponding value of the attribute. A determination is made whether the file is resident or nonresident (Step S96). If the value is a resident value (Yes, Step S96), the system will backup the file record segment containing the attribute. If it is non resident (No, Step S98), the system will figure out the LCN/VCN (runlist) and remember the information (Step S100).

If not a file (No, Step S92), other steps are performed (Step S102). For example, if the root entry is index-node, the system will look into index allocation attributes. If it is a directory, the system will traverse through the directory. The system will then add all other clusters, which are not in the list yet, based on a bitmap.

Figure 25:
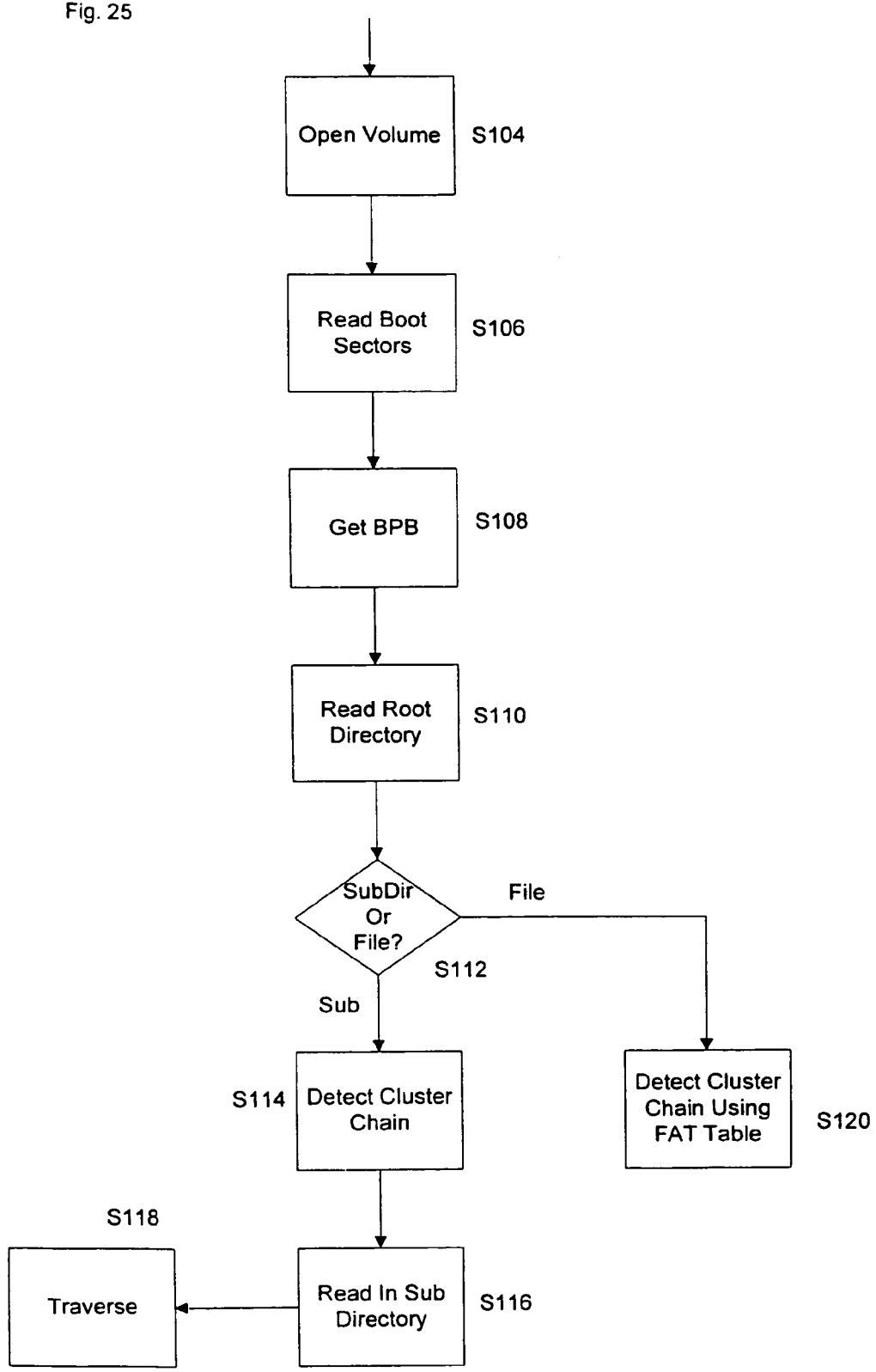

As shown in FIG. 25, for FAT/FAT32, the system opens the Volume (Step S104), reads in the boot sector (Step S106) and gets the BPB (Step S108). The system reads in the root directory (Step S110), and based on each entry in the root, the system may parse it differently. For example, if it is a sub directory (Step S112), the system will determine the cluster chain of the directory (Step S114), read in the subdirectory (Step S116) and traverse through it (Step S118). If it is a file (Step S12), the system will determine the cluster chain of the file using a FAT table (Step S120)

For a snapshot, before backup, the system flushes the volume's cache. The system then freezes the volume (e.g., takes a snapshot) During a backup analysis stage, a snapshot driver will return the original data to a Serverless/image, for the actual data backup. For the serverless system, since data movement happens to the raw disk, a data mover may not be able to give back the original data. Accordingly, at the end of serverless backup, the system may ask the snapshot driver to give all the original data of the modified clusters, and the system will apply that information during restore.

Another example of a system flow for performing serverless backup is shown in FIG. 17. To accomplish serverless backup, the present system obtains a static view of the disk array 152 or portion of the array (Step S40), maps the blocks of data on the disk set to the files to which they belong (Step S42) and moves the data directly from disk array 152 to backup storage media 154 (Step S44).

In order to obtain a static view of the data in the disk array, the present system may use a backup mirror system. An example of a flow for obtaining a static view of the data in the disk array using a backup mirror system is shown in FIG. 18. First, the mirror is established (Step S46). Next, any applications writing to the disk array are stopped (Step S48) and the mirror is then split (Step S50).

Another way to obtain a static copy is to use a snapshot. In this case, as shown in FIG. 19, the system first stops any applications writing to the disk (Step S52) and then creates the snapshot (Step S54).

Figure 20:
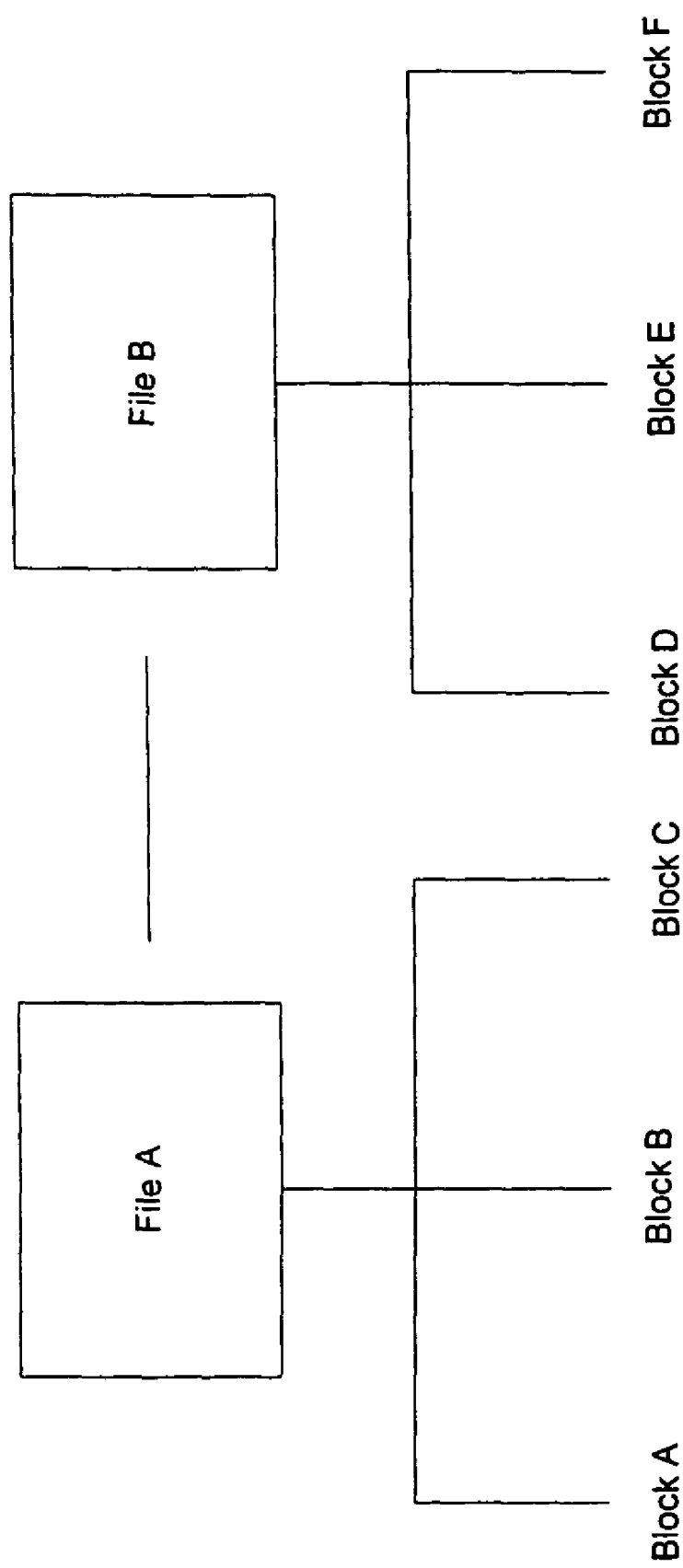
FIG. 20 is a diagram showing files and blocks of data for those files.

The system now has a static view of the disk array to back up. When the data is being transferred from the disk array 152 to the backup storage media 154, the data may be transferred as blocks of data as opposed to being transferred as files. Accordingly, in order to eventually restore a file, the system creates a table or map identifying which blocks belong to which files. For example, as shown in FIG. 20, File A consists of data blocks A, B, and C. File B consists of data blocks D, E, and F. When the snapshot or split mirror is created, these mappings will remain constant until another split mirror or snapshot is created. The present system creates the table or map recording the data block associations for File A and File B. When the user then attempts to restore File A, for example, the present system looks up the blocks associated with File A and restores them. That data blocks being sent from the disk array 152 to the backup storage media 154 are directly transferred using the extended copy command.

When restoring data from the server-free backup system, the user has the option to restore the data on the image level for restoring the entire drive or on the file level for recovering individual files or directories.

An image level restore copies the entire image back from the backup storage media 154 to the disk array 152. File level restore acts just like nonserver-free restores, copying the selected file(s) from the backup storage media 154 to the disk array 152.

To perform image-level server-free restores, the present system creates a snapshot or split mirror to which the data is going to be restored. Next, the present system uses the extended copy command to restore the backed up data directly from the backup storage media 154 to disk 152.

In the above-described embodiments, any applications writing to the drives are stopped while a snapshot or image of the drive is taken. However, instead of stopping the applications writing to the drive, the present system is also capable of waiting for a preferred period in which to take the snapshot or image. For example, the system can synchronize the drive 152 and wait for a period of write inactivity to the drive 152. By default, the period of write inactivity the system looks for prior to freezing the drive (e.g., taking the snapshot), is 3 seconds. However, this period can be user modified if desired. If the specified period of write inactivity (3 seconds) cannot be found, the synchronization times out after a specified timeout period (e.g., 80 seconds) and the freeze request will fail. The specified period of write inactivity is the number of seconds of inactivity what should occur on the drive before the drive is deemed safe to freeze. The timeout period can also be user modified if desired. After the drive is deemed safe to freeze, the snap shot or image of the drive can be performed. In this way, applications are not forced to stop in the middle of processes they may be performing.

The present system may also include GUIs for managing one or more tape libraries. A library is a device containing one or more tape drives with an automated media delivery system, such as a robotic picker, which allows large amounts of data to be backed up without manual intervention. A library may include various components including Barcode ID (if the library supports it). The present system can user the barcode ID to quickly locate individual media by reading the barcode affixed to the media. The libarary may also include one or more magazines (or bins), where one or more groups of storage media (such as tape media) are stored. A robotic picker may be provided that moves the storage media units between the magazine slots and the drives. The library may include one or more drives in a device that transfers (backs up or restores) data between the computer or server and the storage media. A library can contain one or more drives, and from one to several hundred magazines. Smaller libraries are sometimes referred to as autoloaders, or changers. As used herein, the term "library" is used to refer to libraries of any size.

A library can be considered similar to a single storage drive. However, one of the primary differences is that a library typically uses at least two SCSI IDs: one for the library itself and one for each of the library's drives. Some libraries may use a single SCSI ID. When a library uses only one SCSI ID, the library and the library drive may each be assigned a Logical Unit Number (LUN) to differentiate between the drive and library. A single SCSI ID is, in effect, split into two Ids. Using a library has several advantages over the user of individual storage units. For example, using a library, no manual intervention is necessary during backup and restore operations. In addition, libraries can contain multiple storage drives and a large number of media, thus providing large capacity capabilities.

The present system is capable of supporting libraries with multiple drives, as well as those with single drives. The present system can also support multiple libraries. The present system allows a user to track and control an initialization process of the libraries from one location. For multiple drive libraries, the tape engine uses all of the drives for the initialization process. The present system also allows for multiple, concurrent, device management functions, including storage drive cleaning from any specified slot. Support is also provided for various library device management functions including format slot range, erase slot range (both quick and long), import/export, inventory slots, mount magazine, dismount magazine, clean library drive. The present system is capable of using all available drives on a library. If multiple drives are available, device management functions can be performed concurrently.

The present system can quickly locate individual media by reading the barcode that can be affixed to the media. After installation is complete and tape engine is started for the first time, the entire library is inventoried and recorded. The present system provides device configuration which allows the scheduling of library cleaning, providing the library supports this feature. Libraries can be grouped. Library groups employ the same concept as device groups (e.g., server groups) except that library groups are based upon slots. Any of the slots inside a library can be selected to form a library group. If the library runs out of tapes to span to, the user can insert a new tape, and the present system will be able to identify the tape as part of the pre-defined group. The present system can inventory new media which allows a user to insert new media into a library and then continue the backup or restore operation without interruption. If a drive in a multiple drive library becomes defective, the defective drive can be marked as offline. This enables the Tape Engine to continue to operate using the remaining non-defective drives in the library. The present system can search for a media by name or by a slot number depending on the user's preference. The present system provides large library support, allowing a changer with more than 1000 slots to be displayed in a list to the user. Slots can be displayed in four ways: large icons, small icons, details, and list.

The library can be configured from a Device Configuration menu. First, a tape library is chosen from a Device Configuration menu. A library setup screen then appears. If the tape engine is running, a window appears to let the user stop the engine. The tape engine should be stopped in order to configure a library device. If the library supports device serial numbers, the drives should already be configured and will appear in a Library Devices list. If the drives have not been assigned to the Library automatically, they can be assigned manually. This can be done by first highlighting the drive and the Library, and then clicking an Assign button. Assigning a drive to a library allows the present system to be aware of the drive's existence within the library. If drives are being assigned manually, the drives inside multi-drive libraries should be assigned in the correct order. For example, usually the library is configured by the manufacturer in such a way that the first library drive has the lowest SCSI ID number, and the last library drive has the highest SCSI ID number. However, this may not always be the case.

The next setup window then appears. The user highlights the library and clicks a Properties button so that a properties dialog appears. The Properties dialog allows the user to specify which slot holds the cleaning tape (if present) and if a bar code reader is installed.

After configuring the library, the present system runs an inventory. At this stage, the user can mark drives as either online or offline. In this way, defective drives (in a multi-drive library) can be marked as being offline, so that the present system can continue to operate using the remaining non-defective drives. When the drive is repaired or replaced, it can then easily be brought back online, by again performing the library setup procedure described above.

The present system also includes a virtual library feature for addressing a wide spectrum of storage requirements. The virtual library feature enables physical libraries to be configured into smaller virtual (logical) libraries, while still sharing the same robotics, import/export slots and cleaning media. The Virtual Library feature provides the flexibility to configure large libraries into smaller virtual libraries enabling a user to create different combinations of RAID level devices and/or stand alone tape libraries.

A Virtual Library configuration utility is used to set up all virtual libraries. This utility allows the user to define virtual libraries and their parameters, including the number of slots and drives required for the library. At minimum, a virtual library should have at least one slot and one drive associated with it.

The user can create a virtual library using the following steps. First, the user selects a Device Configuration menu. After clicking a Next button, a Device Configuration dialog is displayed. The user can select Virtual Library and click the Next button. A screen is then displayed, allowing the user to select from an Available Library window, the library to be configured into a virtual library. After selected, the characteristics associated with the parent physical library are displayed in a Detail field. Information associated with an adapter card, SCSI Bus, SCSI ID and LUN is displayed. In addition, a field displays the total slots available for this virtual library. From a library tree that is displayed, the user can select the drives to be associated with the newly created virtual library. Drives can be assigned to a virtual library in any order, although drives cannot be shared between virtual libraries. In addition, each virtual library should have at least one drive and one slot assigned to it. The user then selects the number of slots to be assigned to this virtual library. The newly created virtual library is then displayed in the Virtual Libraries window. If a particular library still has drives unassigned after this step, the available resources will be displayed in an "Available Library" window. The entire physical library that is being worked with may be configured into virtual libraries. All drives and slots for a selected physical library may be used.

The present system allows the slots in a library to be separated into groups. Grouping slots allows several types of jobs to be run at the same time. In addition, if several slots are available in a group, you can let the library span the media in the group for you. By default, the first time the present system is started, all of the slots in each library that are attached to the machine are automatically assigned to that library group. For example, if there are two libraries attached to the machine, there will be two library groups. All of the slots in the first library will be assigned to GROUP0, and all of the slots in the second library will be assigned to GROUP1. These library group names can be kept, or the user can regroup and rename them. Since each slot in a library is viewed as a virtual storage drive, each slot can be assigned its own group.

Figure 21:
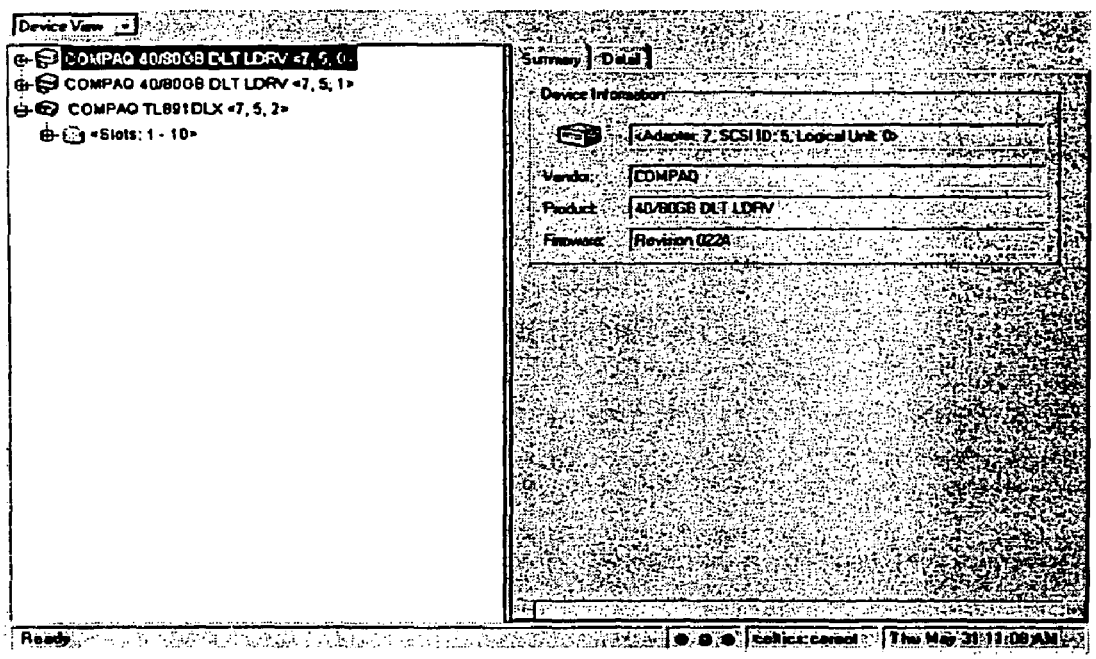
FIGS. 21 and 22 are GUIs allowing a user to configure libraries.
Figure 22:
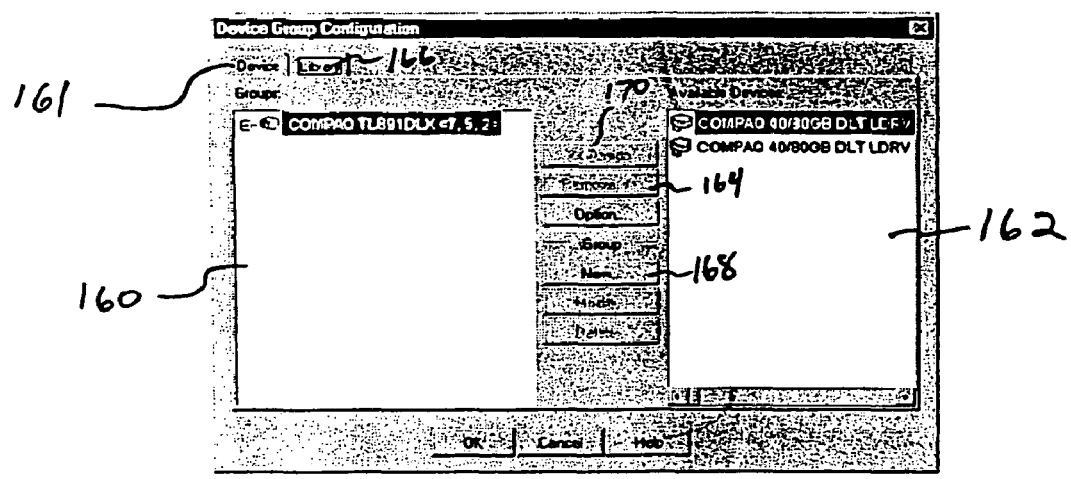

The present system allows a user to configure libraries using a GUI. The user can configure (or modify the configuration of) a library by starting a Device Manager. After the system retrieves library device information, the user can select a Device view and locate and select the library device that they wish to configure. The user will be presented with a screen such as that shown in FIG. 21. To configure a device, when a Device Group Configuration window appears, the user clicks the Device tab 161. On the devices window (FIG. 22) there are two sub-windows. On the left side window 160 are the groups and on the right side window 162 are the available devices. the user can take the drive from the Groups list and place it into the Available Devices list. For example, to move the drive from the Group list to the Available Devices list, the user clicks the device they desire to move and clicks Remove button 164. This makes the drive available to any library that the user wants to configure it in. The user then clicks the Library tab 166 and the tape drive you moved is then in the previous tab in the Available Devices list and the changer in the Groups list.

To create a New Group, the user clicks the changer in the list of Groups and clicks New button 168. A New Group dialog appears. The user then types a name for this group that is eight characters or less, chooses a starting and ending slot range, and clicks OK. Groups can also be assigned in a similar manner using Assign button 170.

The present system and method is capable of working in an SAN environment, in which each server that is connected in SAN maintains the information of the shared storage device in the SAN, decides what it wants to do with the media and the tape drive of the device, and lets other servers know about its decision and also shares any change of state in the device initiated by it.

As described above with respect to FIG. 6, one server in the loop is designated as primary and remaining servers are designated as distributed. The primary server 13 is responsible for initializing and inventorying the devices connected over the SAN. The primary server 13 also runs a global locking process called "sanghost" to synchronize access to the storage devices between different servers. The distributed servers 15a-15n take the device information details from the primary server 13 and initialize their internal structures. Once all the servers are up and running they are independent and intelligent enough to make their own decisions. Communication between servers is through a peer system layer that is active on all servers in the SAN.

If one server (e.g., distributed server 15b) wants to back up data and decides to use one drive and media in backup storage device 16a, then it first requests a global lock from the "snapshot" process running on the primary server 13. If no other server is holding this lock, this requesting server gets the lock and can safely go ahead with its operation. Otherwise it has to wait till it can get the global lock. Once server 15b is able to get the global lock, it checks its internal tables, to determine if the drive and media have already been locked by any other server or by itself. If they have not been locked, then server 15b marks that drive and media as locked and propagates that information to other servers on the SAN through its peer system. It then releases the global lock so that other servers can do whatever they want to do with other drives and media. As a server moves media from slot to drive and vice versa, it updates other servers about this action so that they can update their internal tables. In case the media is formatted (or reformatted), the information is propagated to all other servers. After server 15b is finished with its operation, it will again request the global lock, and then tell all other servers to unlock that drive and media. Server 15b will also unlock them from its own internal tables and then release the global lock.

If the primary server 13 crashes, since all other servers know the state of the devices, any other server can be promoted as the primary server on the fly.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A serverless backup system for backing up information on a network including one or more servers, comprising:
a storage system for storing information to be backed up and restored, the storage system operable to:
receive the information from a plurality of workstations; and
store the information received from the plurality of workstations; and
a backup storage system for backing up the information and restoring the information, the backup storage system coupled to the storage system and to one or more servers via a network, the backup storage system operable to:
obtain a static view of a relevant portion of the storage system, wherein the static view is obtained using one or more of a backup mirror system and taking a snapshot of the relevant portion of the storage system, wherein a period of write inactivity to the storage system is waited for prior to obtaining the static view;
map one or more blocks of data comprising the information being backed up to corresponding files; and
back up the information by transferring the information being backed up using one or more data movers operable to transfer the information being backed up directly from the storage system to the backup storage system, using one or more extended copy commands, without going through the one or more servers; and
restore the information by transferring the information being restored using one or more data movers operable to transfer the information being restored directly from the backup storage system to the storage system, using one or more extended copy commands, without going through the one or more servers.

2. The system as recited in claim 1, wherein the backup storage system comprises a tape storage system.

3. The system as recited in claim 1, wherein the storage system comprises a disk storage system.

4. The system as recited in claim 1, wherein the network comprises a storage area network.

5. The system as recited in claim 1, wherein the static view is obtained by taking the snapshot of the relevant portion of the storage system, the snapshot being taken prior to transferring information directly from the storage system to the backup storage system.

6. The system as recited in claim 1, wherein the period of inactivity is a predefined period of time.

7. The system as recited in claim 6, wherein the predefined period of time is three seconds.

8. The system as recited in claim 1, wherein if the period of write inactivity does not occur by time a timeout period has expired, the transfer fails.

9. The system as recited in claim 8, wherein the timeout period is a predefined period of time.

10. The system as recited in claim 9, wherein the predefined period of time is 80 seconds.

11. A serverless backup method for backing up information on a network including one or more servers, comprising:
providing a storage system for storing information to be backed up and restored, the storage system operable to:
receive the information from a plurality of workstations; and
store the information received from the plurality of workstations;
providing a backup storage system for backing up the information and restoring the information, the backup storage system coupled to the storage system and to one or more servers via a network;
obtaining a static view of a relevant portion of the storage system, wherein the static view is obtained using one or more of a backup mirror system and taking a snapshot of the relevant portion of the storage system, wherein a period of write inactivity to the storage system is waited for prior to obtaining the static view;
mapping one or more blocks of data comprising the information being backed up to corresponding files;
backing up the information by transferring the information being backed up using one or more data movers operable to transfer the information being backed up directly from the storage system to the backup storage system, using one or more extended copy commands, without going through the one or more servers; and
restoring information by transferring information being restored using one or more data movers operable to transfer the information being restored directly from the backup storage system to the storage system, using one or more extended copy commands, without going through the one or more servers.

12. The method as recited in claim 11, wherein the backup storage system comprises a tape storage system.

13. The method as recited in claim 11, wherein the storage system comprises a disk storage system.

14. The method as recited in claim 11, wherein the network comprises a storage area network.

15. The method as recited in claim 11, wherein the static view is obtained by taking the snapshot of the relevant portion of the storage system, the snapshot being taken transferring information directly from the storage system to the backup storage system.

16. The method as recited in claim 11, wherein the period of write inactivity is a predefined period of time.

17. The method as recited in claim 16, wherein the predefined period of time is three seconds.

18. The method as recited in claim 11, wherein if the period of write inactivity does not occur by time a timeout period has expired, the transfer fails.

19. The method as recited in claim 18, wherein the timeout period is predefined period of time.

20. The method as recited in claim 19, wherein the predefined period of time is 80 seconds.

21. A computer readable medium including code for performing a serverless backup method for backing up information on a network, the network including a storage device for storing information to be backed up and restored, the storage system operable to receive the information from a plurality of workstations and store the information received from the plurality of workstations, the network further including a backup storage system for backing up the information and restoring the information, the backup storage system coupled to the storage system and to one or more servers via the network, the code comprising:

code for obtaining a static view of a relevant portion of the storage system, wherein the static view is obtained using one or more of a backup mirror system and taking a snapshot of the relevant portion of the storage system, wherein a period of write inactivity to the storage system is waited for prior to obtaining the static view;

code for mapping one or more blocks of data comprising the information being backed up to corresponding files;

code for backing up the information by transferring the information being backed up using one or more data movers operable to transfer the information being backed up directly from the storage system to the backup storage system, using one or more extended copy commands, without going through the one or more servers; and code for restoring the information by transferring the information being restored using one or more data movers operable to transfer the information being restored directly from the backup storage system to the storage system, using one or more extended copy commands, without going through the one or more servers.

22. The medium as recited in claim 21, wherein the static view is obtained by taking the snapshot of the relevant portion of the storage system, the snapshot being taken prior to transferring information directly from the storage system to the backup storage system.

23. The medium as recited in claim 21, wherein the period of write inactivity is a predefined period of time.

24. The medium as recited in claim 23, wherein the predefined period of time is three seconds.

25. The medium as recited in claim 21, wherein if the period of write inactivity does not occur by time a timeout period has expired, the transfer fails.

26. The medium as recited in claim 25, wherein the timeout period is a predefined period of time.

27. The medium as recited in claim 26, wherein the predefined period of time is 80 seconds.

* * * * *